United States Patent
Rajagopal et al.

(10) Patent No.: US 7,233,700 B2
(45) Date of Patent: *Jun. 19, 2007

(54) SYSTEM AND METHOD FOR SIGNAL MATCHING AND CHARACTERIZATION

(75) Inventors: Ram Rajagopal, Austin, TX (US); Lothar Wenzel, Round Rock, TX (US); Dinesh Nair, Austin, TX (US); Darren Schmidt, Cedar Park, TX (US)

(73) Assignee: National Instuments Corporation, Austin, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 11/105,761

(22) Filed: Apr. 14, 2005

(65) Prior Publication Data

US 2005/0177314 A1 Aug. 11, 2005

Related U.S. Application Data

(63) Continuation of application No. 09/760,052, filed on Jan. 12, 2001, now Pat. No. 6,963,667.

(51) Int. Cl.
G06K 9/62 (2006.01)
G06K 9/36 (2006.01)

(52) U.S. Cl. .................. 382/209; 382/218; 382/280

(58) Field of Classification Search ........ 382/115–127, 382/128–132, 209, 217, 218–219, 190, 195, 382/224–225, 278, 280; 702/71
See application file for complete search history.

(56) References Cited

U.S. PATENT DOCUMENTS

| 5,109,431 | A | * | 4/1992 | Nishiya et al. | 382/209 |
| 5,216,750 | A | * | 6/1993 | Smith | 706/18 |
| 5,619,596 | A | * | 4/1997 | Iwaki et al. | 382/278 |
| 5,915,034 | A | * | 6/1999 | Nakajima et al. | 382/124 |

(Continued)

OTHER PUBLICATIONS

Michihiro Uenohara et al. "Use of Fourier and Karhunen-Loeve Decomposition for Fast Pattern Matching with a Large Set of Templates" IEEE vol. 19, No. 8, Aug. 1997, pp. 891-898.

(Continued)

*Primary Examiner*—Samir Ahmed
(74) *Attorney, Agent, or Firm*—Meyertons Hood Kivlin Kowert & Goetzel, P.C.; Jeffrey C. Hood; Mark S. Williams

(57) ABSTRACT

A system and method for selecting a best match of a received input signal from a set of candidate signals, wherein two or more of the candidate signals are uncorrelated. In a preprocessing phase a signal transform (UST) is determined from the candidate signals. The UST converts each candidate signal to a generalized frequency domain. The UST is applied at a generalized frequency to each candidate signal to calculate corresponding generalized frequency component values (GFCVs) for each candidate signal. At runtime, the input signal of interest is received, and the UST is applied at the generalized frequency to the input signal of interest to calculate a corresponding GFCV. The best match is determined between the GFCV of the input signal of interest and the GFCVs of each of the set of candidate signals. Finally, information indicating the best match candidate signal from the set of candidate signals is output.

44 Claims, 14 Drawing Sheets

U.S. PATENT DOCUMENTS

| | | | |
|---|---|---|---|
| 6,137,896 A * | 10/2000 | Chang et al. | 382/118 |
| 6,240,372 B1 * | 5/2001 | Gross et al. | 702/71 |
| 6,249,594 B1 * | 6/2001 | Hibbard | 382/128 |
| 6,404,920 B1 * | 6/2002 | Hsu | 382/190 |
| 6,963,667 B2 * | 11/2005 | Rajagopal et al. | 382/218 |

OTHER PUBLICATIONS

Robert L. Cook, "Stochastic Sampling in Computer Graphics" ACM vol. 5, No. 1, Jan. 1986, pp. 51-72.

Goodrich et al. "Short Papers" IEEE vol. 21, No. 4, Apr. 1999, pp. 371-379.

Cantoni et al. "2-D Object Recognition by Multiscale Tree Matching" Pattern Recognition, vol. 31, No. 10, 1998, pp. 1443-1454.

Nair et al. "Image Processing and Low Discrepancy Sequences" SPIE vol. 3807, Jul. 1999, pp. 102-111.

Dinesh Nair and Lothar Wenzel, Application of Low Discrepancy Sequences and Classical Control Strategies for Image Registration International Society of Information Fusion, Jul. 1999, pp. 706-714.

Terras, Audrey, *Fourier Analysis on Finite Groups and Applications*, "Chapter 15: Fourier Transform and Representations of Finite Groups," London Mathematical Society Student Texts 43, 1999, pp. 240-266.

* cited by examiner

Edges Information 1006

Sampled Pattern 1004

Reference Pattern 1002

Shift Invariant Pattern Matching

SYSTEM AND METHOD FOR SIGNAL MATCHING AND CHARACTERIZATION

CONTINUATION DATA

The application is a continuation of U.S. patent application Ser. No. 09/760,052, titled "System and Method for Signal Matching and Characterization", filed on Jan. 12, 2001 now U.S. Pat. No. 6,963,667, whose inventors are Ram Rajagopal, Lothar Wenzel, Dinesh Nair, and Darren Schmidt.

FIELD OF THE INVENTION

The present invention relates to the field of signal processing, and more particularly to pattern matching and signal characterization.

DESCRIPTION OF THE RELATED ART

A great variety of systems may be characterized by the property that they receive a signal and attempt to match the received signal to one of a series of candidate or template signals. Such signal or pattern matching is common in diverse fields such as telecommunications, wireless telecommunications, radar, machine vision and control, system automation, manufacturing, quality control, acoustics, optics, measurement, filtering, data analysis, and others. Signal types may include 1-dimensional (1-D) signals, 2-D signals, such as images, as well as 3-D and higher dimensional data sets or signals. Signals may also be either analog or digital signals.

The presence of noise or other distortions in the received signal complicates the task of matching or characterizing the received signal. In many systems, the signal matching task may be greatly aided by the use of transforms, such as the well known Fourier Transform. The Fourier Transform may be used to recast the signal data into the frequency domain, which can make certain characteristics or underlying structure more apparent, and thus easier to characterize.

For example, in the field of telecommunications the signal is usually a time-varying voltage or current. Fourier theory teaches that such signals may be represented as a superposition of sinusoidal signals of various frequencies and phase values. The Fourier Transform, in essence, decomposes or separates a signal waveform or function into sinusoids of different frequency, amplitude, and/or phase, which sum to the original waveform, i.e., the Fourier transform identifies or determines the different frequency sinusoids and their respective amplitudes that can be combined to represent the original signal. Understanding this aspect of a signal is important in determining how the signal will behave, e.g., when it passes through filters, amplifiers and communication channels. Fourier analysis provides a means to determine the frequency spectrum of a given signal, i.e., to determine the frequency content of a signal. Even discrete digital communications which use 0's or 1's to send information still have frequency content. The Fourier Transform may be used to move the signal data from the time domain to the frequency domain where the spectral content of the signal may be easily analyzed or compared to other transformed signals.

In one signal matching approach, the candidate signals are shifted and noise-perturbed versions of each other. A signal generally comprises a series of values, and thus may be thought of as a vector. For example, the candidate signals may comprise an initial signal or vector, and a sequence of signals or vectors which are each phase shifted some amount from its predecessor. In many applications it is necessary to analyze a received input signal to determine which of the candidate signals or vectors most closely matches the input signal. One example of this process is shown in FIGS. 1A and 1B and described as follows.

FIGS. 1A and B—Signal Matching (Prior Art)

FIGS. 1A and 1B illustrate a prior art method of determining a "best fit" or "closest match" between an input signal of interest and a set of N candidate signals f, wherein the candidate signals are shifted versions of each other. When the set of candidate signals are shifted versions of each other, then the signals will exhibit properties whereby Fourier techniques may be used in making the determination. FIG. 1A illustrates a preprocessing technique that may be used to preprocess the set f of candidate signals prior to receipt of the signal of interest. This preprocessing performed in FIG. 1A enables a faster and hence more "real time" determination of the closest candidate signal in the set of candidate signals f when the input signal is received as shown in FIG. 1B.

As shown in FIG. 1A, in step 102 the set of candidate signals f may be stored in a memory. As mentioned above, the set of candidate signals f comprises an initial signal $f_0$ and shifted versions of the signal $f_0$, referred to as $f_1$, $f_2$, ... $f_{N-1}$. In step 104 the method may include selecting a frequency, e.g., the $k^{th}$ frequency, that is present in each of these candidate signals. Step 104 may also be stated as selecting the $k^{th}$ row of a matrix $W_N$ wherein the matrix $W_N$ comprises the standard Fourier matrix. In step 106 the preprocessing method calculates the value of the Fourier transform at the $k^{th}$ frequency for a first candidate signal in the set of candidate signals. This may be performed by applying the Fourier transform, e.g. an FFT, on the first candidate signal $f_0$ and using the value produced at the respective $k^{th}$ frequency for the Fourier transform calculation. Alternatively, this computation may be performed by computing the vector product between the $k^{th}$ row of the matrix $W_N$ and the first candidate signal according to the equation $$F_k = W_N(k) * f_0,$$

In step 108 the method computes and stores the values of the Fourier transform at the $k^{th}$ frequency for each of the shifted versions of the first signal $f_0$. The values of the Fourier transform at the $k^{th}$ frequency may be referred to as $\alpha(n)$, or alpha(n). The values of the transformation at the $k^{th}$ generalized frequency for the shifted versions of the first signal may be computed according to the expression:

$$\alpha(n) = \exp\left(\frac{2\pi n}{N}k\right) * F_k,$$

where $F_k$ is calculated above in 106.

This expression uses the shift invariant property of the Fourier transform to substantially reduce the number of calculations required, i.e., the fact that in the frequency domain the candidate signals are shifted versions of the first signal $f_0$ allows the Fourier transforms of the remainder of the candidate signals to be computed easily from the Fourier transform of the first candidate signal. Alternately, the values of the transformation at the $k^{th}$ generalized frequency for the remaining set of N candidate signals may be computed by applying the Fourier transform at the $k^{th}$ generalized frequency to each of remaining candidate signals, as was applied to the first candidate signal in 106.

The preprocessing performed in FIG. 1A allows a faster determination when an input signal of interest is received. FIG. 1B illustrates the method performed when an input signal of interest g is received to determine the closest match of the set of candidate signals with the input signal g. As shown, in step 122 the input signal of interest g is received. In step 124 the method calculates the Fourier transform, e.g., using an FFT of g at the $k^{th}$ frequency. The value of the Fourier transform of g at the $k^{th}$ frequency may be referred to as alpha bar. The alpha bar value may also be computed according to the equation $$\bar{\alpha} = W_N(k)^*g,$$

where $W_N(k)$ refers to the $k^{th}$ row vector of the matrix $W_N$.

In step 126 the method determines the best match between $\bar{\alpha}$ and the $\alpha(n)$ values corresponding to each of the candidate signals. This operates to determine the closest candidate signal to the input signal of interest g. In step 128 this closest candidate signal may then be output as a final result.

As noted, the method described in FIGS. 1A and 1B may be used when the set of candidate signals are shifted versions of each other, wherein this characteristic allows the use of Fourier transform techniques to greatly simplify and speed up the analysis. However, when one or more of the signals in the set of candidate signals are not shifted versions of each other, e.g., are uncorrelated, then the method described in FIGS. 1A and 1B cannot be used. The problem of attempting to match a received input signal of interest with one of a set of candidate or template signals, wherein two or more of the signals comprised in the set of candidate or template signals are uncorrelated with each other, arises in many diverse fields. Further, there are no fast techniques available which can be used to determine a closest match between an input signal of interest and a set of uncorrelated signals.

Thus, there exists a substantial need for a system and method for matching a received signal to one of a set of independent candidate signals.

SUMMARY OF THE INVENTION

The present invention comprises various embodiments of a system and method for determining or selecting a best match of a received input signal from a set of candidate signals, wherein two or more of the candidate signals are uncorrelated. In a preferred embodiment, the method may comprise a preprocessing phase and a runtime phase for enhanced performance.

In one embodiment of the preprocessing phase, a unified signal transform may be determined from the set of candidate signals. In one embodiment, the unified signal transform may be operable to convert each of the set of candidate signals to a generalized frequency domain, i.e., the unified signal transform may be operable to convert each of the set of candidate signals into a representation of generalized basis functions, wherein the basis functions represent the algebraic structure of the set of candidate signals. Stated another way, the unified signal transform may be operable to decompose the signal into generalized basis functions, wherein the basis functions represent the algebraic structure of the set of candidate signals. In one aspect, the unified signal transform may be considered a type of "generalized Fourier or Frequency Transform" that is designed specifically for the set of uncorrelated candidate signals.

In one embodiment, calculating the unified signal transform for the set of candidate signals may include:

forming a matrix B from all of the values of the candidate signals, wherein each of the candidate signals comprises a corresponding column of the matrix B;

defining a matrix B', wherein the matrix B' comprises a column-wise cyclic shifted matrix B;

defining a matrix A, wherein the matrix A comprises a cyclic shift matrix operator, wherein multiplying matrix A times matrix B performs a column-wise cyclic shift on matrix B, thereby generating matrix B', wherein AB=B', wherein A=B'B$^{-1}$, wherein B$^{-1}$ comprises an inverse matrix of matrix B, and wherein A$^N$=an N×N identity matrix, I;

performing a Jordan decomposition on A=B'B$^{-1}$, thereby generating a relation A=X$_B$ΛX$_B^{-1}$, wherein X$_B$ comprises a matrix of normalized columnar eigenvectors of matrix B, wherein Λ comprises a diagonal matrix of eigenvalues of matrix B, and wherein X$_B^{-1}$ comprises an inverse matrix of matrix X$_B$; and calculating matrix X$_B^{-1}$, wherein the matrix X$_B^{-1}$ comprises the unified signal transform. It should be noted that the matrix X$_B^{-1}$ may be calculate by any of a variety of methods well known in the art.

After the unified signal transform has been determined, the transform may be applied for one or more generalized frequencies to each of the candidate signals in the set to calculate corresponding generalized frequency component values for each of the candidate signals.

In one embodiment of the runtime phase of the present invention, the input signal of interest may be received. The unified signal transform may then be applied for the one or more generalized frequencies to the input signal of interest to calculate corresponding generalized frequency component values for the input signal of interest.

The best match may then be determined between the one or more generalized frequency component values of the input signal of interest and the one or more generalized frequency component values of each of the candidate signals.

Finally, information indicating a best match candidate signal from the set of candidate signals may be output.

In one embodiment, the set of candidate signals may comprise a number of candidate signals, wherein each of the candidate signals comprises a number of values, and wherein the number of values is equal to the number of candidate signals. In other words, the matrix B formed from the candidate signals may comprise a square matrix. In another embodiment, the matrix B may be regular.

In one embodiment, prior to determining a unified signal transform from the set of candidate signals, the initial set of N candidate signals may be manipulated. For example, in the initial set of candidate signals, at least one of the candidate signals may comprise a set of M values, wherein M is not equal to N. In such cases, the candidate signal data may be "padded" or extended to provide a square matrix B. For example, in an embodiment where M is less than N, additional N–M values may be provided for the "short" candidate signal, thereby ensuring that each one of the set of candidate signals comprises N values. In one embodiment, providing additional N–M values may comprise interpolating or extrapolating two or more of the M values to generate the additional N–M values. Alternately, where M is less than N, a curve may be fit to the M values for the "short" candidate signal, then sampled to generate N values for the candidate signal, thereby ensuring that each one of the set of candidate signals comprises N values.

In another embodiment, the number of initial candidate signals may be less than the number of values in each candidate signal. In one embodiment, additional candidate signals (of N values each) may be provided to ensure a square matrix B. In one embodiment, the additional candidate signals may be chosen or generated arbitrarily.

In one embodiment, after the best match candidate signal has been determined, the best match candidate signal may be processed to determine if the best match candidate is an acceptable match. In another embodiment, the best match candidate signal may be processed to determine characteristics of the received input signal of interest. For example, the determined best match candidate signal may comprise a (substantially) noise-free version of the input signal of interest, and thus may be more suitable for determining characteristics of the input signal.

In one embodiment, all of the candidate signals may be uncorrelated with each other. In one embodiment, the input signal of interest and the candidate signals may be 1-dimensional signals, 2-dimensional signals, 3-dimensional signals, or signals of a dimensionality greater than 3. In various applications of the present invention, the input signal of interest and the candidate signals may comprise one or more of image data, measurement data, acoustic data, seismic data, financial data, stock data, futures data, business data, scientific data, medical data, insurance data, musical data, biometric data, and telecommunications signals. It should be noted that these examples are meant to be illustrative only, and are not intended to limit the domain of application of the method.

BRIEF DESCRIPTION OF THE DRAWINGS

A better understanding of the present invention can be obtained when the following detailed description of the preferred embodiment is considered in conjunction with the following drawings, in which.

Figure 1A:
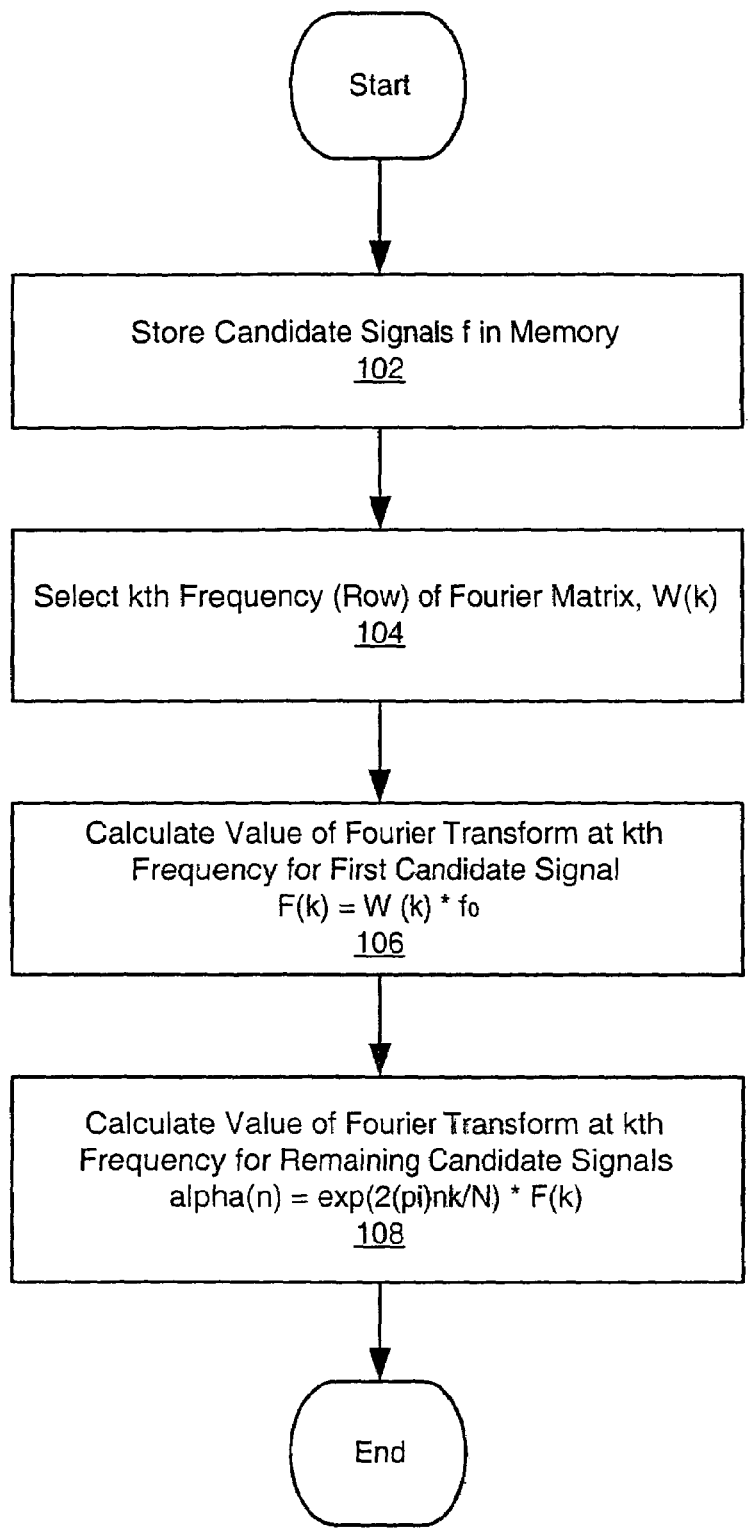
FIGS. 1A and 1B are flowcharts of a method for signal matching, according to the prior art.
Figure 1B:
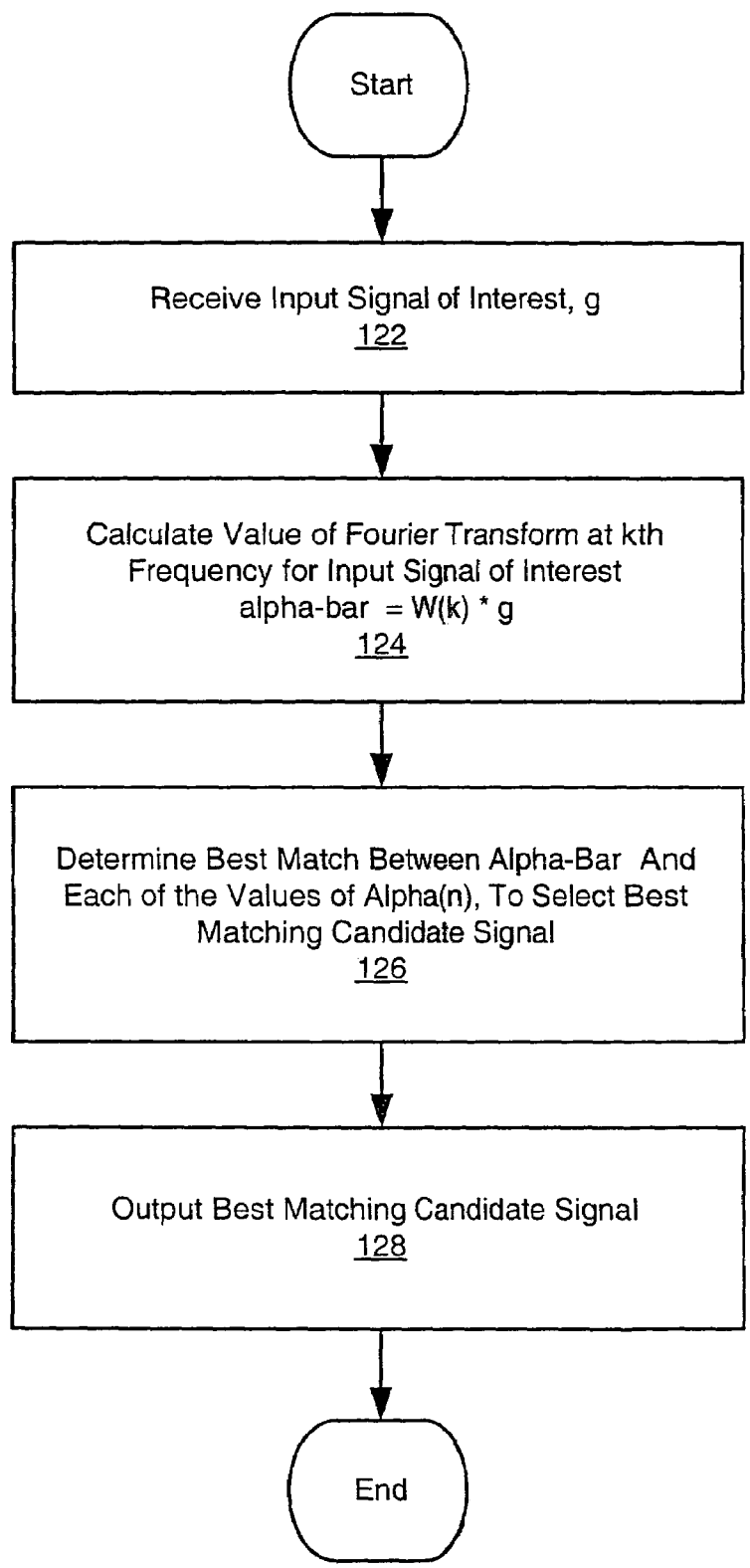

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 09/760,052, titled "System and Method for Signal Matching and Characterization", filed on Jan. 12, 2001.

Figure 2:
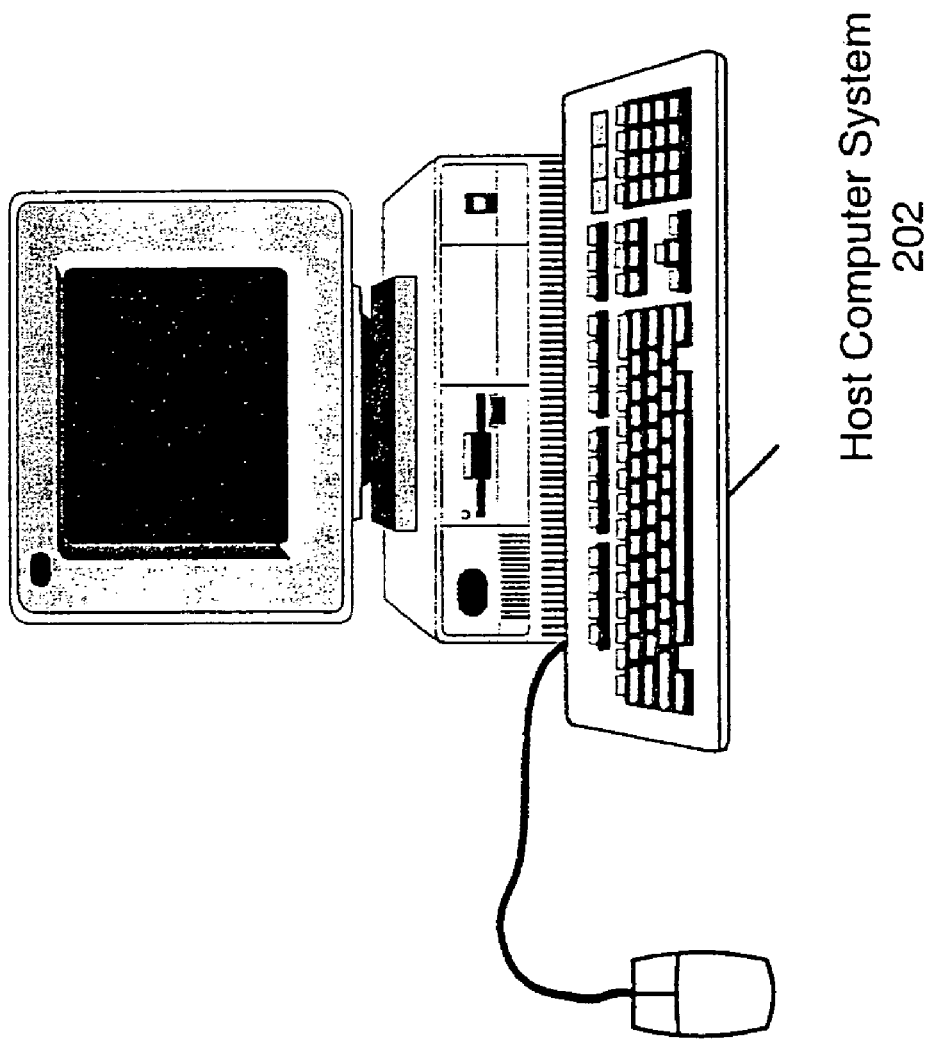
FIG. 2 illustrates a computer system which may perform a method according to one embodiment of the present invention.

FIG. 2—Computer System

FIG. 2 illustrates an exemplary computer system according to one embodiment of the invention. The computer system 202 may store and/or execute a software program which performs the method described in FIGS. 7A, 7B, and 8 below. In one embodiment, the computer system 202 may include a display device, such as a monitor, as well as a chassis and one or more I/O devices, such as a keyboard and/or mouse. However, the computer system may take any of various forms, such as a personal computer, or any type of device which includes a processor that executes instructions from a memory medium, or which includes programmable logic that has been configured to perform the methods described in FIGS. 7A, 7B, and 8. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a method or algorithm, such as that described in FIGS. 7A and 7B, and 8.

Thus, the method of the present invention may be implemented in any of various types of devices and any of various types of applications. Example applications where the method described herein may be used include instrumentation systems, industrial automation or process control systems, telecommunication systems, machine vision systems and any other application where it is desirable to determine a best match or closest fit between an input signal of interest and a set of candidate signals, wherein two or more of the candidate signals may be uncorrelated with respect to each other. More specific applications wherein the method of the present invention may be used include matched filter detection logic in a telecommunication system, as well as analysis and/or pattern matching related to image data, measurement data, acoustic data, seismic data, financial data, stock data, futures data, business data, scientific data, medical data, insurance data, musical data, biometric data, and telecommunications signals, among others.

FIGS. 3A, 3B, 4A, 4B and 5 illustrate various exemplary applications where the invention may be used. However, it is noted that the invention is not limited to these applications, but rather may be used in any of various applications.

Figure 3A:
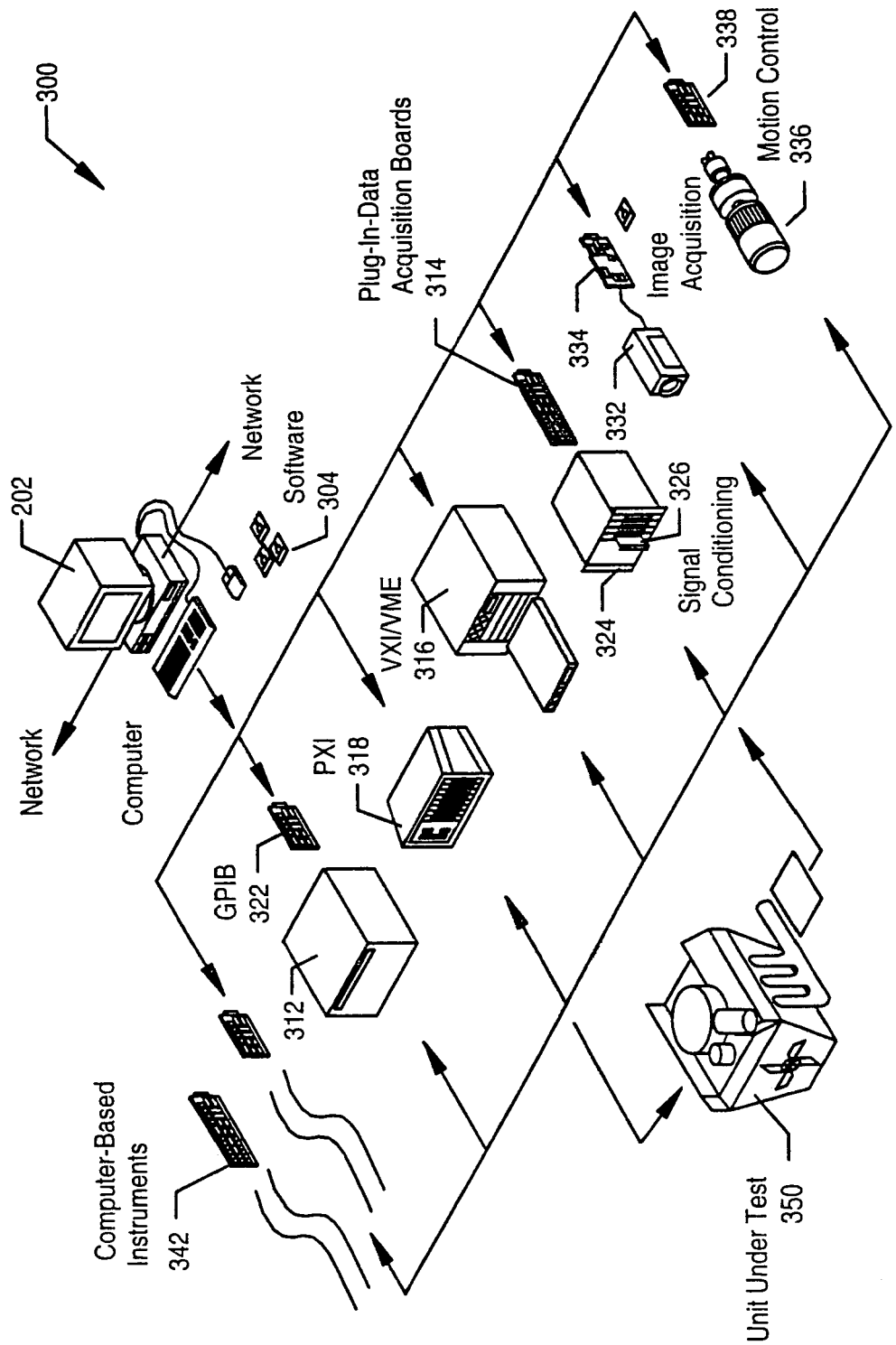
FIGS. 3A and 3B illustrate representative instrumentation and process control systems which may perform a method according to one embodiment of the present invention.
Figure 3B:
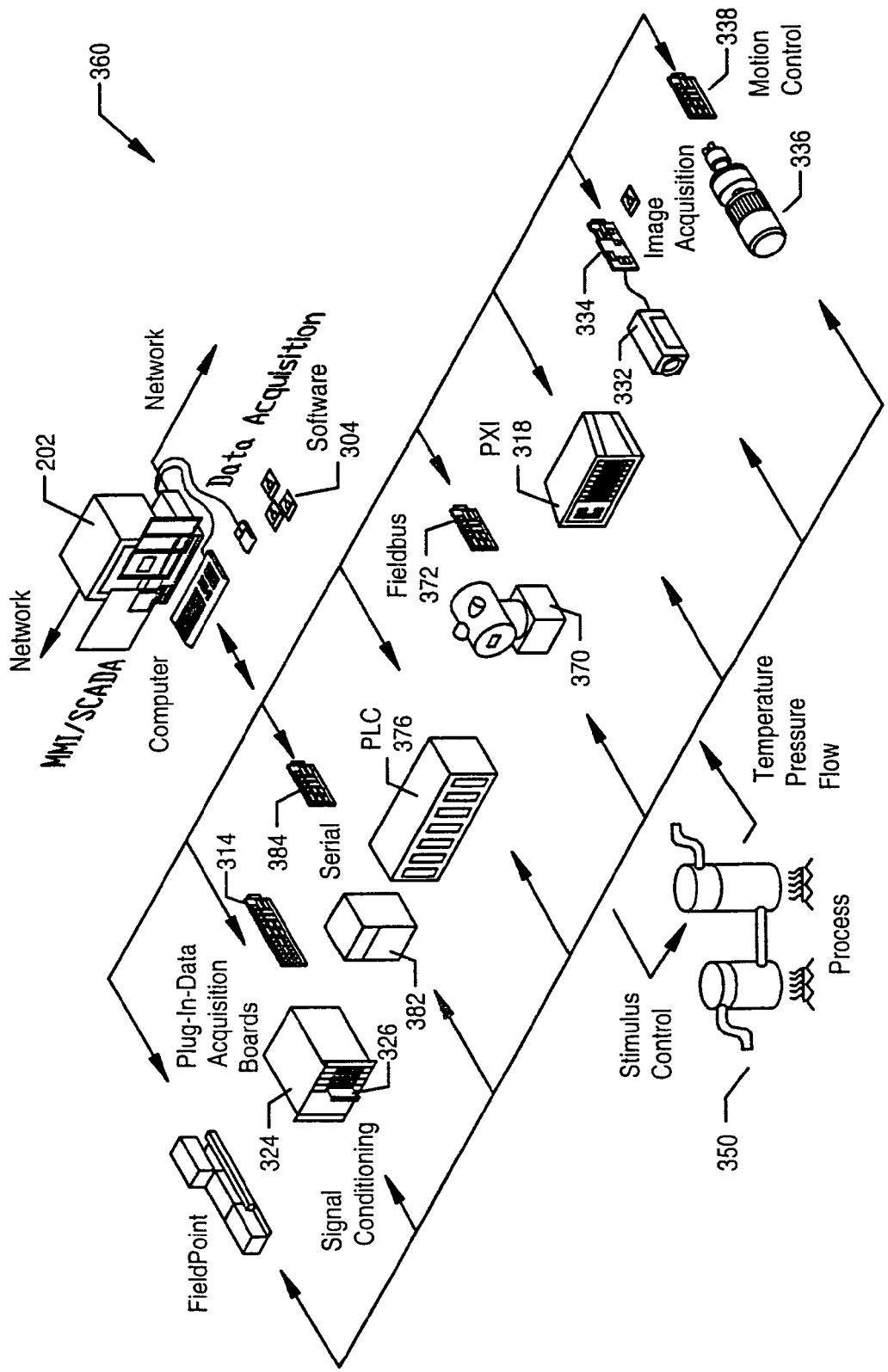

FIGS. 3A and 3B—Instrumentation and Industrial Automation Systems

FIGS. 3A and 3B illustrate exemplary measurement and automation systems that may include or execute software programs according to one embodiment of the present invention. These programs may of course be stored in or used by other types of systems as desired.

FIG. 3A illustrates an exemplary instrumentation control system 300. The system 300 may comprise a host computer 202 which connects to one or more devices or instruments. The host computer 202 may comprise a CPU, a display, memory, and one or more input devices such as a mouse or keyboard, as shown. The host computer 202 connects through the one or more instruments to analyze, measure, or control a unit under test (UUT) or process 350. The one or more instruments may include a GPIB instrument 312 and associated GPIB interface card 322, a data acquisition board 314 and associated signal conditioning circuitry 324, a VXI instrument 316, a PXI instrument 318, a video device 332 and associated image acquisition card 334, a motion control device 336 and associated motion control interface card 338, and/or one or more computer based instrument cards 342, among other types of devices.

The GPIB instrument 312 may be coupled to the computer 202 via the GPIB interface card 322 provided by the computer 202. In a similar manner, the video device 332 may be coupled to the computer 202 via the image acquisition card 334, and the motion control device 336 may be coupled to the computer 202 through the motion control interface card 338. The data acquisition board 314 may be coupled to the computer 202, and may interface through signal conditioning circuitry 324 to the UUT. The signal conditioning circuitry 324 may comprise an SCXI (Signal Conditioning eXtensions for Instrumentation) chassis comprising one or more SCXI modules 326.

The GPIB card 322, the image acquisition card 334, the motion control interface card 338, and the DAQ card 314 are typically plugged in to an I/O slot in the computer 202, such as a PCI bus slot, a PC Card slot, or an ISA, EISA or MicroChannel bus slot provided by the computer 202. However, these cards 322, 334, 338 and 314 are shown external to computer 202 for illustrative purposes.

The VXI chassis or instrument 316 may be coupled to the computer 202 via a VXI bus, MXI bus, or other serial or parallel bus provided by the computer 202. The computer 202 preferably includes VXI interface logic, such as a VXI, MXI or GPIB interface card (not shown), which interfaces to the VXI chassis 316. The PXI chassis or instrument may be coupled to the computer 202 through the computer's PCI bus.

A serial instrument (not shown) may also be coupled to the computer 202 through a serial port, such as an RS-232 port, USB (Universal Serial bus) or IEEE 1394 or 1394.2 bus, provided by the computer 202. In typical instrumentation control systems an instrument will not be present of each interface type, and in fact many systems may only have one or more instruments of a single interface type, such as only GPIB instruments.

The instruments are coupled to the unit under test (UUT) or process 350, or are coupled to receive field signals, typically generated by transducers. The system 300 may be used in a data acquisition and control application, in a test and measurement application, a process control application, or a man-machine interface application.

FIG. 3B illustrates an exemplary industrial automation system 360. The industrial automation system 360 is similar to the instrumentation or test and measurement system 300 shown in FIG. 3A. Elements which are similar or identical to elements in FIG. 3A have the same reference numerals for convenience. The system 360 comprises a computer 202 which connects to one or more devices or instruments. The computer 202 comprises a CPU, a display screen, memory, and one or more input devices such as a mouse or keyboard as shown. The computer 202 may connect through the one or more devices to a process or device 350 to perform an automation function, such as MMI (Man Machine Interface), SCADA (Supervisory Control and Data Acquisition), portable or distributed data acquisition, process control, advanced analysis, or other control.

The one or more devices may include a data acquisition board 314 and associated signal conditioning circuitry 324, a PXI instrument 318, a video device 332 and associated image acquisition card 334, a motion control device 336 and associated motion control interface card 338, a fieldbus device 370 and associated fieldbus interface card 372, a PLC (Programmable Logic Controller) 376, a serial instrument 382 and associated serial interface card 384, or a distributed data acquisition system, such as the Fieldpoint system available from National Instruments, among other types of devices.

The DAQ card 314, the PXI chassis 318, the video device 332, and the image acquisition card 336 are preferably connected to the computer 202 as described above. The serial instrument 382 is coupled to the computer 202 through a serial interface card 384, or through a serial port, such as an RS-232 port, provided by the computer 202. The PLC 376 couples to the computer 202 through a serial port, Ethernet port, or a proprietary interface. The fieldbus interface card 372 is preferably comprised in the computer 202 and interfaces through a fieldbus network to one or more fieldbus devices. Each of the DAQ card 314, the serial card 384, the fieldbus card 372, the image acquisition card 334, and the motion control card 338 are typically plugged in to an I/O slot in the computer 202 as described above. However, these cards 314, 384, 372, 334, and 338 are shown external to computer 202 for illustrative purposes. In typical industrial automation systems a device will not be present of each interface type, and in fact many systems may only have one or more devices of a single interface type, such as only PLCs. The devices are coupled to the device or process 350.

Figure 7A:
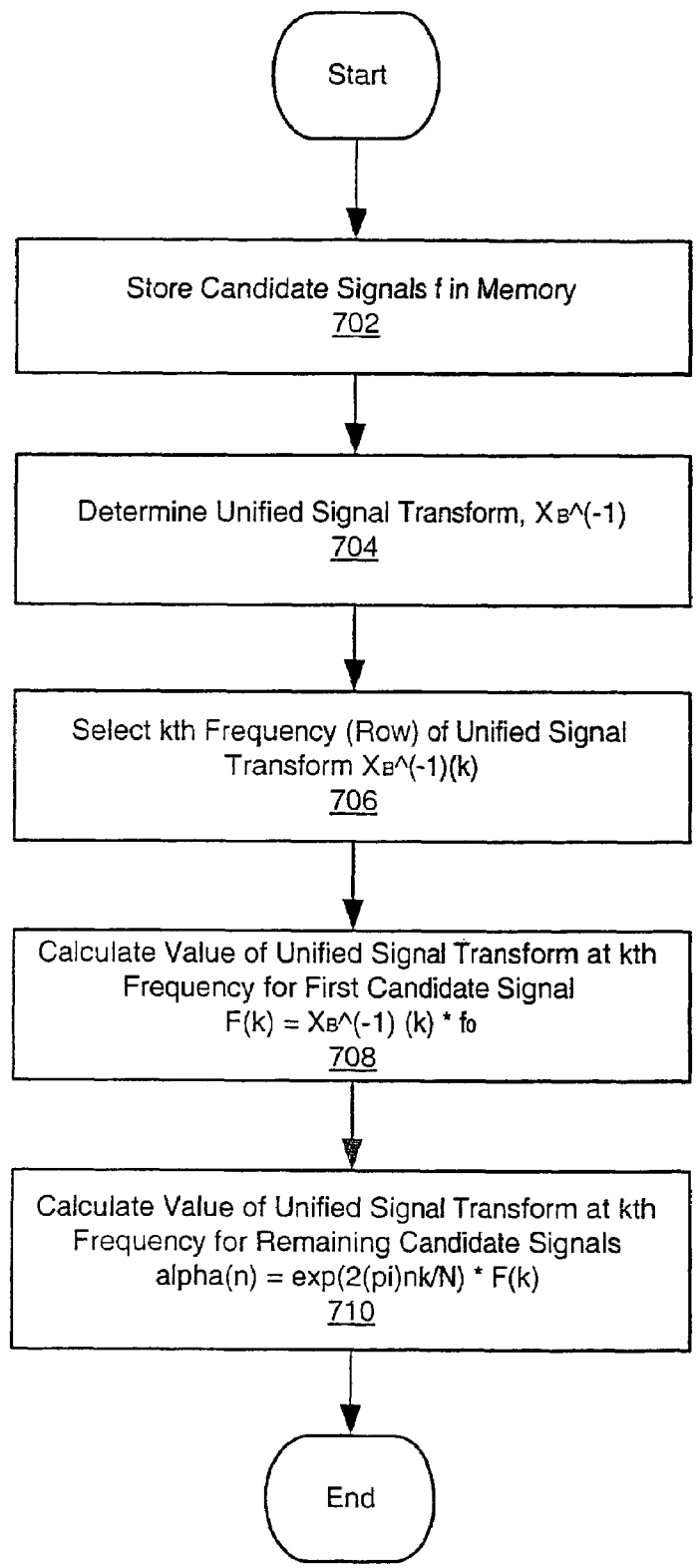
FIG. 7A is a flowchart diagram illustrating a preprocessing step performed on the set of candidate signals according to one embodiment of the invention.
Figure 7B:
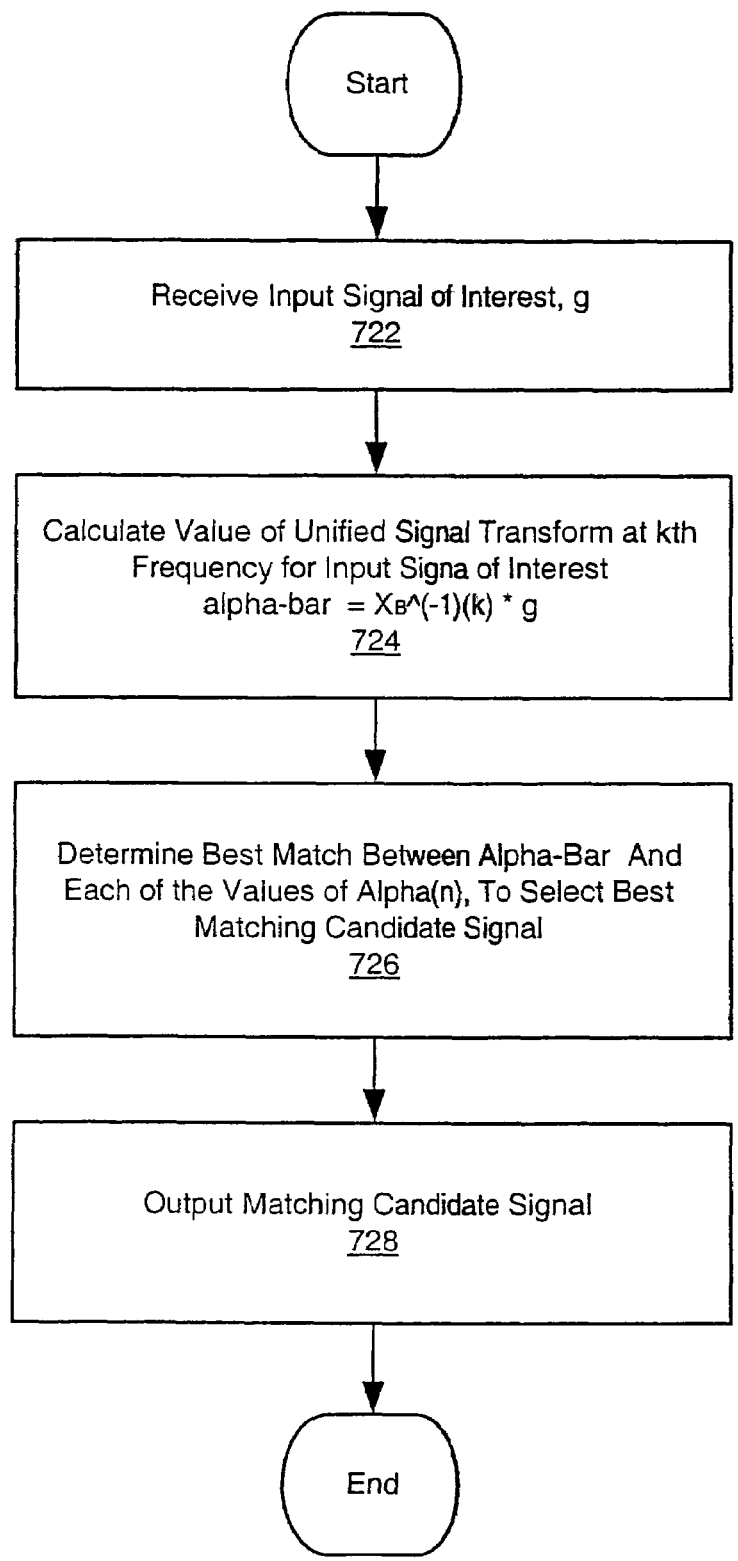
FIG. 7B is a flowchart diagram illustrating a method for determining a closest match between an input signal of interest and one of the set of candidate signals according to one embodiment of the invention.
Figure 8:
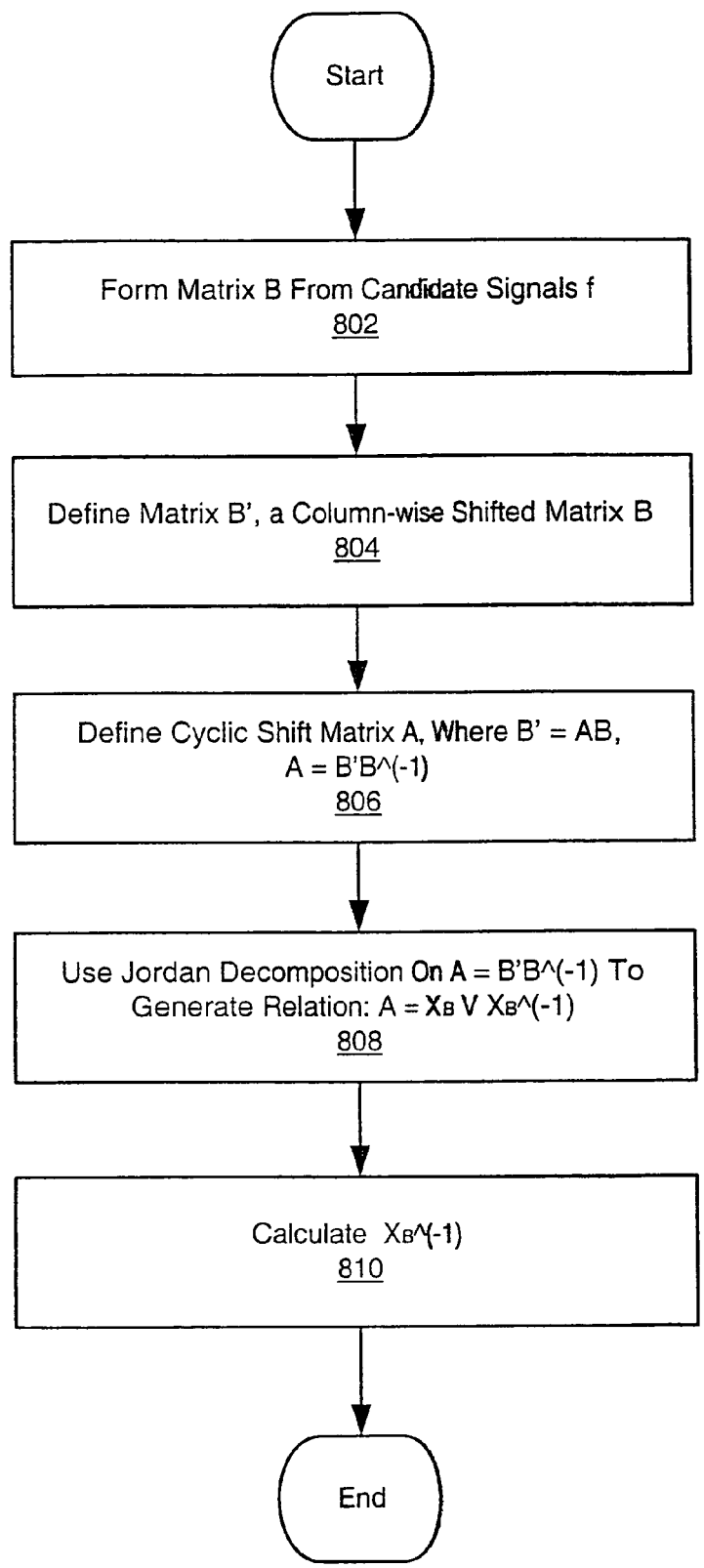
FIG. 8 is a flowchart illustrating a method for calculating the unified signal transform, according to one embodiment.

The host computer 202 shown in FIGS. 3A and 3B may execute a software program which performs the method described in FIGS. 7A, 7B, and 8. For example, the host computer 202 may preprocess a set of candidate signals as shown in FIG. 7A. The host computer 202 may also receive an input signal of interest that is measured or acquired by one of the instruments of devices shown in FIGS. 3A and 3B and perform the method shown in FIG. 7B to determine a "best fit" or "closest match" between the input signal of interest and a candidate signal from a set of candidate signals S.

Figure 4A:
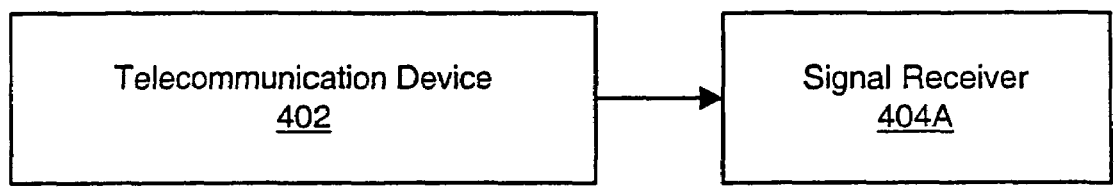
FIG. 4A is a diagram of a telecommunications system, according to one embodiment.
Figure 4B:
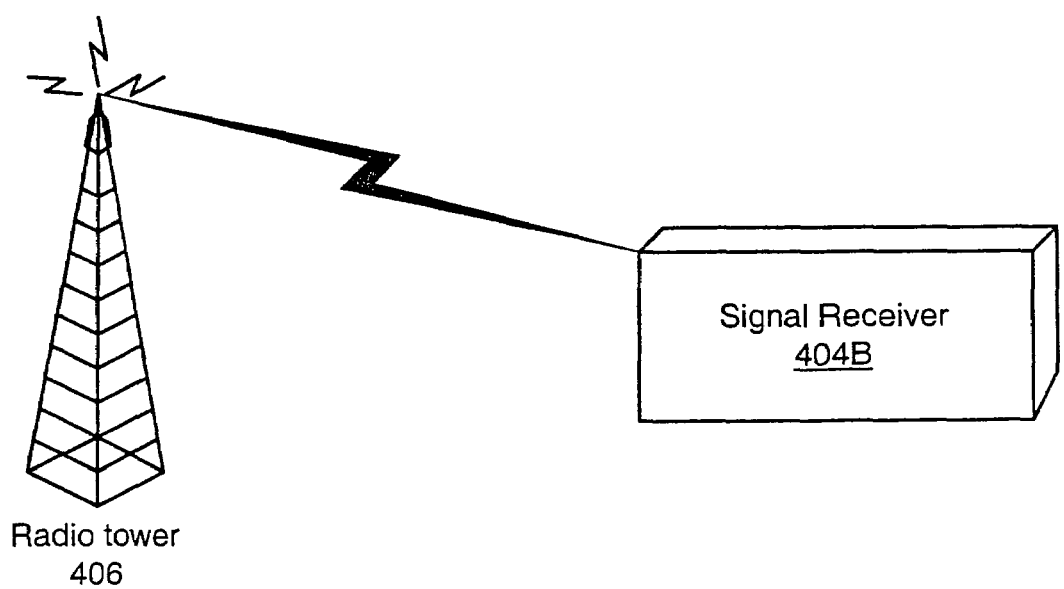
FIG. 4B is a diagram of a wireless telecommunications system, according to one embodiment.

FIGS. 4A and 4B—Telecommunications Systems

FIGS. 4A and 4B illustrate wired and wireless telecommunications systems, respectively, which are exemplary examples of applications for the methods described in FIGS. 7A and 7B. As FIG. 4A shows, a telecommunication device 402 may be coupled to a signal receiver 404A. The telecommunication device 402 may be operable to transmit signals or data to the signal receiver 404A which may be operable to receive the transmitted signals or data. The signal receiver 404A may include various filters to characterize and/or select a waveform of interest from a received signal. In telecommunications, a filter is a device that selectively sorts signals and passes through a desired range of signals while suppressing the others. This kind of filter may be used to suppress noise or to separate signals into bandwidth channels. For example, the received signal may have a high noise content which may obscure the waveform or signal of interest, and so a pattern selection process may be applied to extract or recognize the desired waveform or signal from the received signal.

Alternately, the received signal may comprise any one of a plurality of waveforms from which a desired waveform is to be characterized and selected. The present method may be applied to find a best match between the received signal and a set of candidate signals. In real-world applications of signal transmission the presence of noise in the received signal must be dealt with. For example, a Caller ID process in a telephony device extracts identification information from the incoming signal to determine the origin of the telephone call. This information may be in the form of a digital signal and may contain noise as well. The Caller ID process must therefore perform signal matching to characterize the identification signal as a recognizable waveform.

FIG. 4B illustrates a wireless telecommunication system, according to one embodiment. As FIG. 4B shows, a radio tower 406 may be operable to broadcast signals in a wireless manner to a wireless receiver 404B. The wireless receiver 404B may be operable to receive the signals and select out a waveform or signal of interest from the received signals. As noted above, in real world situations transmitted signals include noise which must be filtered out to make the signals usable. This is especially true with wireless communications because any number of signals may be present simultaneously in the same medium (the airways), including noise from sources as diverse as electrical equipment and solar winds. Thus, filtering is central to the operations of cellular telephony or any other wireless telecommunications systems. Systems for cellular telephony include TDMA (Time Division Multiple Access) used by GSM (Global System for Mobile Communications), CDMA (Code Division Multiple Access), and FDMA (Frequency Division Multiple Access), each of which provides a way to multiplex wireless communications to increase the effective bandwidth of the limited wireless spectrum. One embodiment of the invention may involve receiving an input CDMA signal of interest g and determining a best match for g among a set of candidate signals or codes in the CDMA system.

Figure 5:
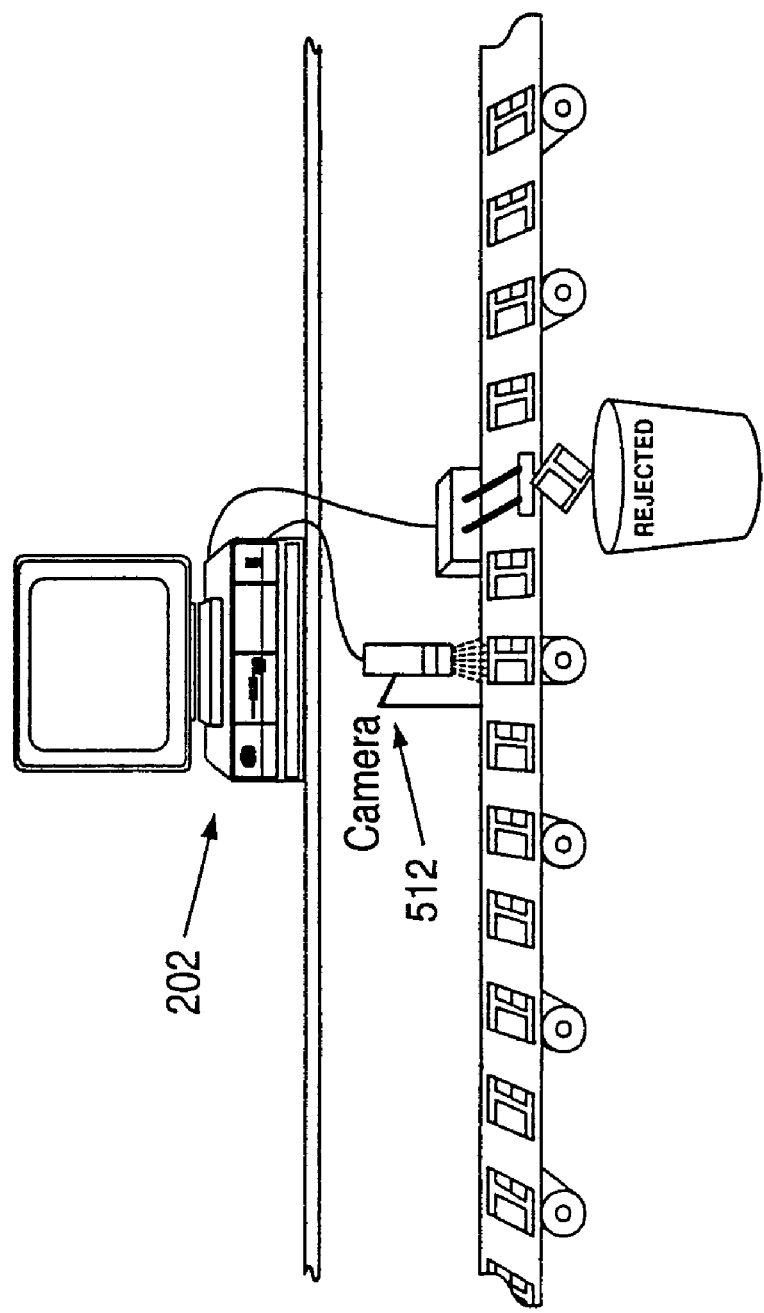
FIG. 5 illustrates a machine vision system, according to one embodiment.

FIG. 5—A Machine Vision System

FIG. 5 illustrates one embodiment of a machine vision system. As FIG. 5 shows, the machine vision system comprises a host computer 202 and a video source 512. The video source 512 produces an analog or digital video signal which comprises a sequence of video frames, or other data desired to be acquired. The analog or digital video signal is provided to the host computer 202 for storage and/or processing.

In machine visions such as that shown in FIG. 5, a common task is to recognize the presence or absence of particular forms or objects, also called Blobs (Binary Large Objects) in a video frame. For example, a machine vision system may be deployed in a manufacturing plant to inspect circuit boards for quality control. The system may specifically look for proper placement and orientation of components, such as computer chips. This task requires pattern matching in that the system must process image information, looking for an object or Blob which matches one of a set of candidate forms. In one embodiment, these objects may constitute 2D signals. In another embodiment, 2D image information may be processed to generate characteristic 1D signals which may be matched with candidate 1D signals. For example, a horizontal scan or sampling of a 2D image may be used to generate characteristic feature points, such as at the edges of objects. In another embodiment, image information may be sampled in a certain region of the object. The resulting pixel information may be interpreted as a 1D signal, and used to characterize the 2D image. It is noted that the present method is not limited to 1D or 2D signals, but may be applied to signals or data sets of any dimensionality.

Machine vision systems such as described above are often required to process the image data in or near real-time, which places-severe constraints on the performance of pattern matching methods. Various embodiments of the present method, described below, provide an extremely fast and efficient way of determining a "best match" of a received signal from or among a set of candidate signals.

Figure 6:
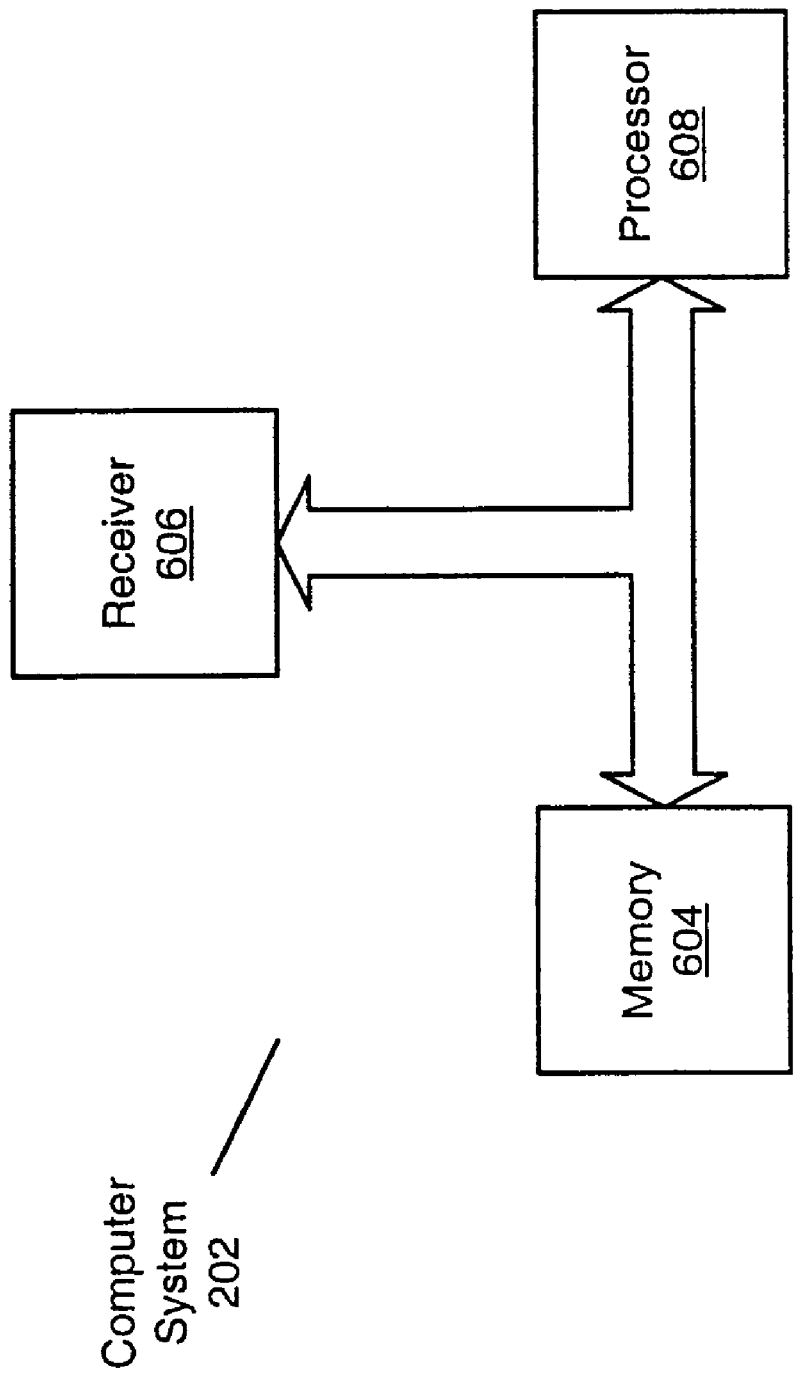
FIG. 6 is a block diagram of a computer system according to one embodiment of the invention.

FIG. 6—Computer System Block Diagram

The computer system shown in FIG. 6 is an exemplary embodiment, including a processor 608 which is operable to execute program instructions, a memory medium 604 which is operable to store program instructions and data, and a receiver 606 which is operable to receive signals or data from an external source. FIG. 6 is an exemplary block diagram of the computer system illustrated in FIG. 2, such as may be used in any of the systems shown in FIGS. 3-5. It is noted that any type of computer system configuration or architecture can be used in conjunction with the system and method described herein, as desired, and that FIG. 6 illustrates a representative PC embodiment. It is also noted that the computer system may be a general purpose computer system such as illustrated in FIGS. 3A and 3B, a computer implemented on a VXI card installed in a VXI chassis, a computer implemented on a PXI card installed in a PXI chassis, or other types of embodiments. The elements of a computer not necessary to understand the present invention have been omitted for simplicity. The computer 202 may have various other components, such as one or more buses, a power supply, I/O devices, chipset logic, or other components as is conventional in various types of computer systems.

Memory and Carrier Medium

The computer system 202 preferably includes a memory medium on which software according to an embodiment of the present invention may be stored. The memory medium may store a set of candidate signals S, wherein two or more of the candidate signals may be partially or completely uncorrelated with respect to each other. In one embodiment, a majority or all of the signals in the set of candidate signals S are uncorrelated with respect to each other. The memory medium may also store a software program for preprocessing the set of candidate signals S as described below with reference to FIG. 7A. The memory medium may further store a software program for analyzing an input signal of interest to determine a best match between the input signal of interest and one of the set of candidate signals S.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the software program is stored or executed, or may be located in a second different computer which connects to the first computer over a network, such as the Internet. In the latter instance, the second computer provides the program instructions to the first computer for execution. Also, the computer system 202 may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs as described herein may be designed for use in measurement systems, including systems which perform data acquisition/generation, analysis, and/or display, or for use in automation systems. In another embodiment, the software programs may be designed for use in a telecommunications systems. In other embodiments, the software programs may be designed for use in business, financial, scientific, biometric, or medical analysis, among others.

However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

FIGS. 7A and 7B

FIGS. 7A and 7B illustrate one embodiment of a method for determining a "closest match" or "best match" between an input signal of interest and one of a set of candidate signals. Stated another way, FIGS. 7A and 7B illustrate one embodiment of a method for determining a "best match" or "closest match" of an input signal of interest from a set of candidate signals. It should be noted that two or more of the candidate signals are uncorrelated, i.e., are not shifted versions of one another. In one embodiment, all of the candidate signals are uncorrelated with each other.

FIG. 7A—Preprocessing the Set of Candidate Signals

FIG. 7A is a flowchart diagram illustrating one embodiment of a method for preprocessing a set of N candidate signals, which may also be referred to as vectors. As noted above, the set of N candidate signals may be partially or completely uncorrelated. As used herein, the term "uncorrelated" is intended to include the case where two or more of the signals in the set of N candidate signals are uncorrelated. In a typical scenario, a majority or all of the signals in the set of candidate signals may be uncorrelated.

As shown, in step 702 the set of N candidate signals may be stored in a memory medium. The set of N candidate signals may be stored in a memory medium comprised on the computer 202 which performs the method of FIG. 7B or the set of candidate signals may be stored in a different computer system. In a similar manner, the preprocessing method described in FIG. 7A may be performed by the same computer system which implements the method of FIG. 7B, or may be performed in a different computer system as desired.

It should be noted that in the preferred embodiment, each of the N candidate signals is comprised of N values, i.e., the number of values in each candidate signal is equal to the number of candidate signals.

In step 704 a signal transform, referred to herein as the "unified signal transform" may be determined for the set of N candidate signals may be determined. The unified signal transform may include a set of basis functions which describe an algebraic structure of the set of candidate signals. The unified signal transform determined in step 704 comprises a completely new type of signal transform heretofore unknown in the prior art. This new transform, which is referred to herein as a unified signal transform, converts a signal into a representation of, or comprising, generalized basis functions, wherein the basis functions represent the algebraic structure of the set of candidate signals. Stated another way, the signal transform is operable to decompose the signal into a form represented by generalized basis functions. The basis functions represent the algebraic structure of the set of signals. The unified signal transform may be used to convert a signal into a domain referred to as the "generalized frequency domain". The unified signal transform described herein is the first and only signal transform able to project a set of uncorrelated signals into a generalize frequency domain.

The unified signal transform described herein may be considered a superset or generalization of a plurality of existing transforms, including the Fourier transform and the Haar transform. Thus, whereas the Fourier transform may decompose a signal into frequency components of a set of sinusoidal waveforms, the unified signal transform described herein decomposes a signal into components of a set of generalized basis functions, also referred to as generalized frequency components. Where the set of signals used to generate the transform are shifted versions of each other, the generalized basis functions reduce to the sinusoidal waveforms used in Fourier analysis, i.e., the unified signal transform reduces to the standard Fourier transform. In a similar manner, when a set of N signals exhibits other particular characteristics, the generalized basis functions may reduce to the Haar, Walsh, or Hadamar transform basis functions, among others. Thus, the transform that is determined in step 704 may be considered a more generalized or unifying signal transform for the set of N signals. The operation of determining the unified signal transform for the set of N signals is described in greater detail in the flowchart of FIG. 8. The final result of the unified signal transform is a transform that may be represented as $X_B^{-1}(k)$.

In step 706 the method selects the $k^{th}$ row of $X_B^{-1}(k)$. This operates to select the $k^{th}$ "generalized frequency" of the transform, which may be applied to a signal to calculate the $k^{th}$ generalized frequency component of that signal.

In step 708 the method calculates the values of a transformation at the $k^{th}$ generalized frequency for a first candidate signal of the set of candidate signals. This computation may be performed according to the equation:

$$F_k = X_B^{-1}(k) * f_0,$$

where $f_0$ is the first candidate signal of the set of candidate signals. This calculation generates a complex value $F_k$ which includes both magnitude and phase information for the component of the first candidate signal at the generalized frequency k.

In step 710 the method computes and stores values of the transformation at the $k^{th}$ generalized frequency for the remaining N−1 candidate signals. In the preferred embodiment, the values of the transformation at the $k^{th}$ generalized frequency for the remaining N−1 candidate signals are computed by the expression:

$$\alpha(n) = \exp\left(\frac{2\pi n}{N} k\right) * F_k,$$

where $F_k$ is calculated above in 708.

This expression uses the shift invariant property of the transform to substantially reduce the number of calculations required. In another embodiment, the values of the transformation at the $k^{th}$ generalized frequency for the remaining N−1 candidate signals may be computed by applying the unified transform at the $k^{th}$ generalized frequency to each of remaining candidate signals, as was applied to the first candidate signal in 708. In one embodiment, one or more values of the signal transform applied to each of the candidate signals may be calculated at at least one generalized frequency, k. In one embodiment, the signal transform may be applied to each of the set of candidate signals at more than one generalized frequency to produce a plurality of transformation values for each candidate signal.

Thus, the method has computed and stored the values of the unified signal transformation for at least one generalized frequency (e.g., the $k^{th}$ generalized frequency) for each of the signals in the set of candidate signals. Therefore, in summary, the method may calculate one or more values of the unified signal transform ("the transformation") for each of the set of candidate signals at at least one generalized frequency, wherein, for each respective one of the set of candidate signals, the transformation comprises the signal transform applied to a respective one of the set of candidate signals. It should be noted that the term "transformation" refers to the values which result from the application of the transform (the unified signal transform) to a signal. Thus, as noted above, the unified signal transform for at least one generalized frequency may be applied to each of the set of candidate signals to calculate a corresponding at least one generalized frequency component value for each of the set of candidate signals.

Thus, the preprocessing method shown in FIG. 7A may compute the signal transform determined in step 704 for the set of candidate signals at the $k^{th}$ generalized frequency for each of the set of candidate signals. In one embodiment, the signal transform is the unified signal transform. However, other types of signal transforms which exhibit the properties of the unified signal transform described herein may be used. In the preferred embodiment, only the values of the transformation at the $k^{th}$ generalized frequency are computed.

As described further below, when the input signal of interest is received, the unified signal transformation of the input signal g may also be performed at the $k^{th}$ generalized frequency and a best match determination can be performed between the transformation value of the input signal at the $k^{th}$ generalized frequency and the precomputed values of the transformation at the $k^{th}$ generalized frequency for each of the set of candidate signals.

FIG. 7B—Receive Input Signal g and Determine Best Match

FIG. 7B is a flowchart diagram illustrating operation of the processing which is performed when an input signal of interest g is received. As described above, the problem is to determine the best match between the input signal of interest g and one signal from the set of candidate signals.

As shown, in step 722 the input signal of interest may be received. The input signal of interest g may be received in any of various ways and for any of various applications. For example, in a telecommunication matched filter application, the input signal of interest may be a received telecommunications signal that corresponds to one of a set of codes or candidate signals. Other examples of input signals may include, but are not limited to, biometric feature signals, images, signals of heart or brain function, such as electrocardiograms (EKG) or electroencephalograms (EEG), stock price data, or other signals or data sets. It should be noted that these applications of the present method are for illustrative purposes only, and are not intended to limit the applicability of the present method to any particular domain or use, but rather, the present method is intended for use in matching or characterizing any kind of data set of any dimensionality.

In step 724 the method calculates the transformation of the input signal g at the $k^{th}$ generalized frequency using the unified signal transform determined in step 704 of FIG. 7A. The value of the unified signal transformation of g at the $k^{th}$ generalized frequency may be referred as $\bar{\alpha}$, or alpha-bar. The transformation of g at the $k^{th}$ generalized frequency may be computed according to the equation:

$$\bar{\alpha} = X_B^{-1}(k) g.$$

In one embodiment, one or more values of the signal transform applied to the input signal of interest may be calculated at one or more generalized frequencies, k. In one embodiment, where a plurality of the signal transform values are calculated for a plurality of different generalized frequencies $k_1$, $k_2$, etc., for each of the set of candidate signals, then a corresponding plurality of signal transform values are calculated for the same plurality of different generalized frequencies $k_1$, $k_2$, etc. for the input signal of interest.

In step 726 the method determines the best match between $\bar{\alpha}$ and $\alpha(n)$ values of the candidate signals determined in step 708 and 710. Thus, in step 726 the method determines the best match between the at least one generalized frequency component value of the input signal of interest and the at least one generalized frequency component value of each of the set of candidate signals. In other words, a best match is found between the value of the unified signal transform of the input signal g at the $k^{th}$ generalized frequency compared and the value of the unified signal transform of each of the signals in the set of candidate signals at the $k^{th}$ generalized frequency. Stated another way, a best match is determined between the one or more values of the transformation of the input signal of interest and the one or more values of the transformation for each of the set of candidate signals.

In one embodiment, in step 726 the method determines the best match by finding an $\alpha(n)$ value that has the smallest distance to, or differs the least from, the computed $\bar{\alpha}$ value.

This may be accomplished by calculating the difference between each of the α(n) values and $\bar{\alpha}$ (e.g., subtracting each of the respective α(n) values from $\bar{\alpha}$) and then determining a smallest difference between or among the α(n) values and $\bar{\alpha}$. The best match between each of the α(n) values and $\bar{\alpha}$ may also be determined using other methods, as desired.

In step 728 the method outputs the closest signal of the set of candidate signals, i.e., the signal that produces the best match with respect to the input signal. In other words, information is output indicating a closest match candidate signal of the set of candidate signals. This information may be an index or label indicating the "best match" candidate signal, or may comprise the "best match" signal itself. The "best match" candidate signal may be output in various ways. For example, the "best match" candidate signal may be displayed on a display screen and/or saved or logged to file. Alternatively, the "best match" candidate signal may be provided to other components or logic circuitry in the system for processing. For example, in a telecommunication application, the "best match" candidate signal may be provided to other telecommunication logic to decode, interpret, or further process the received signal.

In one embodiment, after the best match candidate signal has been determined, the best match candidate signal may be processed to determine if the best match candidate is an acceptable match. For example, if the received input signal of interest is not represented among the set of candidate signals, a "best match" may still be found, but which, after further analysis, may be determined to be an inappropriate match for the input signal. If the determined best match candidate is not acceptable, then information to that effect may be output. In another embodiment, the best match candidate signal may be processed to determine characteristics of the received input signal of interest. For example, the determined best match candidate signal may comprise a (substantially) noise-free version of the input signal of interest, and thus may be more suitable for determining characteristics of the input signal.

FIG. 8—Unified Signal Transform Calculation

FIG. 8 is a flowchart of a calculation of the unified transform mentioned above with reference to FIG. 7A (704), according to one embodiment. As mentioned above, the unified transform is preferably calculated in a preprocessing phase of the pattern matching process for improved performance.

As FIG. 8 shows, in 802 a first matrix B is formed from the set of candidate signals. In a preferred embodiment, the set of candidate signals comprises N candidate signals, each of which comprises N values, wherein the number of values is equal to the number of candidate signals. The values from each of the candidate signals comprise a corresponding column of the first matrix B, such that a first candidate signal comprises a first column of the matrix B, a second candidate signal comprises a second column of B, and so on. The fact that the number of values in each candidate signal (column) is equal to the number of candidate signals (columns) means that the resulting first matrix B is square, i.e., the number of columns in the first matrix is equal to the number of rows in the first matrix. In another preferred embodiment, the first matrix B is a regular matrix, i.e., is not singular. Thus, in a preferred embodiment, the first matrix is a regular N×N matrix. In situations where the number of candidate signals is not equal to the number of values in each signal, auxiliary data may be generated to fulfill this requirement, as described in more detail below.

In 804, a matrix B' may be defined, wherein the matrix B' comprises a column-wise cyclic shifted matrix B. In other words, to generate B', each column vector in matrix B may be shifted one position (to the left or right, depending upon the sign of the shift), with the end column "wrapping" around to the other side of the matrix.

In 806, a matrix A may be defined which comprises a cyclic shift matrix, such that multiplying matrix A times matrix B performs a column-wise cyclic shift on matrix B, thereby generating matrix B'. This may be expressed as AB=B', which may be rewritten as A=B'B$^{-1}$, wherein B$^{-1}$ comprises an inverse matrix of matrix B. The fact that A is the cyclic shift matrix operator for matrix B means that applying the operator N times to B leaves B unchanged. Therefore A$^N$=I, an N×N identity matrix.

In 808, a Jordan decomposition may be performed on A=B'B$^{-1}$, thereby generating a relation $$A = X_B \Lambda X_B^{-1},$$

wherein $X_B$ comprises a matrix of normalized columnar eigenvectors of matrix B, wherein Λ comprises a diagonal matrix of eigenvalues of matrix B, and wherein $X_B^{-1}$ comprises an inverse matrix of matrix $X_B$.

Finally, in 810, the matrix $X_B^{-1}$ is calculated to generate the unified signal transform. It should be noted that the matrix $X_B^{-1}$ may be calculated by any of various methods, as is well known in the art. For example, the eigenvalues for the matrix A may be calculated via the method of determinants, then used to determine the corresponding eigenvectors. The eigenvectors may then be used to form the matrix $X_B$. Finally, the inverse of $X_B$ may be calculated to give $X_B^{-1}$. It is noted that this method becomes unfeasible for large matrices, and so in the preferred embodiments, more efficient methods of solving for $X_B^{-1}$ may be employed. Examples of more efficient methods include iterative methods, and methods based on standard Fourier matrices.

Here, the matrix $X_B^{-1}$ comprises the unified signal transform which may be applied to each of the candidate signals and the received signal of interest, as described above with reference to FIGS. 7A and 7B. As described above, in one embodiment, applying the unified signal transform $X_B^{-1}$ to a signal at a selected generalized frequency may comprise selecting a single row of the unified signal transform matrix $X_B^{-1}$ corresponding to the selected generalized frequency, and multiplying the row (as a vector) times the signal (also as a vector). Thus, applying the transform to the signal may be reduced from a matrix multiplication to a vector multiplication, greatly improving the performance of the method.

In one embodiment, as noted above, the number of values for each candidate signal (or signal of interest) may not be equal to the number of candidate signals. However, in the preferred embodiment of the present invention, the matrix B is assumed to be square (number of rows equals number of columns). In these cases, the data set may be extended to provide the correct form for the matrix. For example, in the case that the number of candidate signals is less than the number of values in each candidate signal, one or more auxiliary candidate signals may be added to the set of candidate signals as appropriate to make the total number of candidate signals equal to the number of values in each candidate signal. In one embodiment, the auxiliary candidate signals may comprise arbitrary signals containing the same number of values as each of the original candidate signals. In another embodiment, the auxiliary candidate signals may be generated by averaging one or more of the original candidate signals.

Alternately, where the number of values in each of one or more candidate signals is not equal to the number of candidate signals, additional auxiliary values may be generated so as to complete the form of each of these candidate signals, i.e., increase the number of values in each candidate signal to match the number of candidate signals. For example, in the case of a given candidate signal having too few values, the additional values may be determined through interpolation, extrapolation, or both. Alternately, if a candidate signal has too few or too many values, the original values may be used to generate a function or curve, which may then be sampled to generate the correct number of values. In other words, a different, but functionally equivalent data set may be generated from the original values of the candidate signal, but having the appropriate number of values. The same techniques may be applied to the input signal of interest, as well.

In other words, in the preferred embodiment, the intent is to ensure that the number of candidate signals and the number of values in each candidate signal (as well as the input signal of interest) are equal.

As mentioned above, in another preferred embodiment, the matrix B generated from the candidate signals according to the method described above is regular, i.e., is not singular. Thus, in this embodiment, the matrix B is not required to be square, and thus no manipulation of the candidate signals is required when the number of values for each candidate signal does not equal the number of candidate signals.

Theory of the Unified Signal Transform

Introduction

The theory of the Unified Signal Transform is described below in the context of an image pattern matching application.

Pattern matching is an important technique in digital image processing. The evolution of computer technology has enabled many practical applications based on pattern matching, especially in industrial automation. One example of an automated pattern matching process is the visual inspection of circuit boards. A typical task is to determine a missing component in circuit boards on a production line. The procedure generally operates on a digital picture of the circuit board. A search of the image is made for a predefined template corresponding to the desired component, i.e., given a test image I, the location of the template $I_t$ within this image is determined. Typical test and template images are shown in FIGS. 9A and 9B.

To properly define a pattern matching problem, all the valid transformations of the template should be clearly specified. In a majority of the applications, the template will appear shifted, rotated and scaled in the test image.

Approaches for solving the proposed problem can be divided into two categories: correlation based solutions and image understanding solutions. Correlation based solutions predominantly use a cross correlation to find the potential locations of the template, whereas image understanding solutions attempt to model the objects observed in the template.

The method described below uses a statistical sampling approach to pattern matching. A new generalized transform (the unified signal transform, described above with reference to FIGS. 7-8) and some of its properties are described. This transform provides the basis for the robust real-time scaling invariant and/or rotation invariant pattern matching method described above with reference to FIGS. 3-8.

Classic Correlation Based Pattern Matching

Traditional pattern matching techniques include normalized cross correlation and pyramidal matching. Normalized cross correlation is the most common way to find a template in an image. The following is the basic concept of correlation: Consider a sub-image w(x,y) of size K×L within an image f(x,y) of size M×N, where K≦M and L≦N. The normalized correlation between w(x,y) and f(xy) at a point (i,j) is given by $$C(i,j) = \frac{\sum_{x=0}\sum_{y=0}(w(x,y)-\overline{w})(f(x+i,y+j)-\overline{f}(i,j))}{\left[\sum_{x=0}^{L-1}\sum_{y=0}^{K-1}(w(x,y)-\overline{w})^2\right]^{\frac{1}{2}}\left[\sum_{x=0}^{L-1}\sum_{y=0}^{K-1}(f(x+i,y+j)-\overline{f}(i,j))^2\right]^{\frac{1}{2}}}$$

where i=0,1, ... M−1, j=0,1. ..N−1, $\overline{w}$ (calculated only once) is the average intensity value of the pixels in the template w. The variable $\overline{f}(i,j)$ is the average value of f in the region coincident with the current location of w. The value of C lies in the range −1 to 1 and is independent of scale changes in the intensity values of f and w.

Figure 9C:
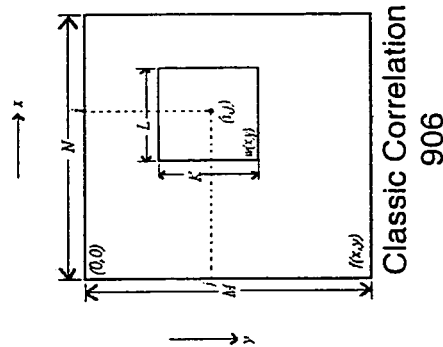
FIG. 9C illustrates a classic correlation method for an industrial pattern matching application, according to one embodiment.
Figure 9B:
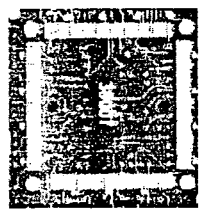
FIG. 9B is an example template image for an industrial pattern matching application, according to one embodiment.
Figure 9A:
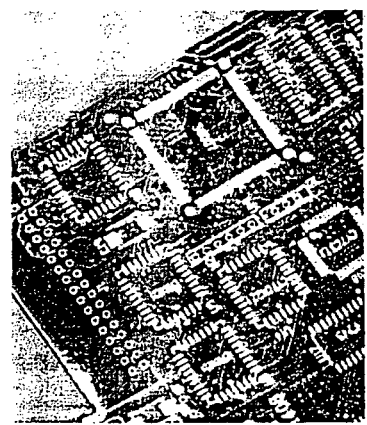
FIG. 9A is an example test image for an industrial pattern matching application, according to one embodiment.

FIG. 9C illustrates the correlation procedure. Assume that the origin of the image f is at the top left corner. Correlation is the process of moving the template or sub-image w around the image area and computing the value C in that area. The maximum value of C indicates the position where w best matches f. Since the underlying mechanism for correlation is based on a series of multiplication operations, the correlation process is time consuming. With new technologies such as Intel Corporation's MMX multimedia chip instructions, multiplications can be done in parallel, and the overall computation time can be reduced considerably. The basic normalized cross correlation operation does not meet speed requirements for many applications.

Normalized cross correlation is a good technique for finding patterns in an image as long as the patterns in the image are not scaled or rotated. Typically, cross correlation can detect patterns of the same size up to a rotation of 5° to 10°. Extending correlation to detect patterns that are invariant to scale changes and rotation is difficult. Approaches based on multidimensional Discrete Fourier Transforms and Principal Component Analysis have been proposed, but are generally considered to be inadequate, due to the slowness of the learning phase and requirements for non-integer operations.

Statistical Sampling Based Pattern Matching

Low discrepancy sequences have been successfully used in a variety of applications that require spatial or multidimensional sampling. A low discrepancy sequence can be described as a sequence that samples a given space as uniformly as possible. Thus, the density of points in relation to the space volume is almost constant.

Images typically contain much redundant information. In a correlation based pattern matching a template image may be subsampled according to a two-dimensional low discrepancy sequence. A set S of N coordinates of the template may be formed and the correlation computed only in relation to these coordinates.

The method has two stages. In the first, possible matches are computed based on a subsampled correlation. A threshold in the correlation value determines the exclusion or inclusion of a match. In the second, the edge information of the template is used to accurately locate the potential match indicated by the first stage. Typically, for a 100×100 template, a set of 61 points is enough to provide a robust correlation basis (160 times faster) for the first stage candidate list generation procedure.

In a pattern matching application where only shift invariance is desired, a Halton low discrepancy sequence can be used. Typically, 61-70 points from the template should be selected.

Unified Signal Transform

Assume that N vectors (signals) of length N are given, denoted by $f_i$. A matrix A may be defined, such that $Af_0=f_1$, $Af_1=f_2, \ldots, Af_{N-1}=f_0$, if the matrix B (N×N) formed by setting each of its columns to the corresponding vector $f_i$ is regular (non-singular). Some properties that arise from the definition of A and B are that:

P1) AB=B', where B' is the matrix B with a column-wise shift (i.e. $f_{i+1 \bmod N}$ corresponds to the column i of B'). B is regular and so is B'. Thus $A=B'B^{-1}$.

P2) $A^N=I$ (N×N identity). Thus, eigenvalues of A are given by $$\left(\lambda_k = \exp\left(\frac{2\pi}{N}k\right), k=0,\ldots,N-1\right).$$

P3) The matrix A can be decomposed as $A=X_B V X_B^{-1}$, where V is the N×N diagonal matrix formed by the eigenvalues $$\lambda_k = \exp\left(\frac{2\pi}{N}k\right).$$

From the stated properties the N×N matrix $X_B^{-1}$ expresses the desired Unified Signal Transform (UST). Theorem 1 proves the shift invariance property for the GT. Theorem 2 shows that if the vectors $f_i$ are shifted versions of each other, then $X_B^{-1}$ is the Fourier matrix. Theorem 3 provides a way to compute the UST in an efficient manner. For proofs of the theorems, please refer to the Theorems section, below.

Theorem 1: The matrix $X_B^{-1}$ defines a shift invariant transformation for the set of vectors $f_i$.

Theorem 2: If the vectors $f_i$ are shifted versions of each other (i.e. $f_i=f([n+i]_N)$) then $X_B^{-1}$ is the Fourier matrix).

Theorem 3: Given a regular matrix B the generalized transform can be computed as $X_B^-=D^{-1}W_N B^{-1}$, where D is an arbitrary complex diagonal matrix. To define a unitary transform the diagonal elements of D should be set to $$d_k = \sqrt{\sum_{i=0}^{N-1}|B_i^{inv}(k)|^2},$$

where $B_i^{inv}(k)$ represents the Discrete Fourier Transform of the $i^{th}$ column of $B^{-1}$.

Choosing a frequency in the UST domain corresponds to selecting a line of the matrix $X_B^{-1}$. Due to the shift invariance property, for a fixed frequency, the set of vectors f maps to points in a circle in the complex plane (FIG. 11A). If the value of g is set $g=X_B^{-1}f_0$, then $|g(k)|$ is the radius of the circle at frequency k. Theorem 3 states that for a unitary transform this radius is given by $1/d_k$. Moreover, the sequence $1/d_k (k=0, \ldots, N-1)$ forms a spectrum equivalent to the Fourier spectrum.

Scaling Invariant Pattern Matching

The requirement for scaling invariance might arise in applications where the distance between the camera and the imaging plane is variable. Usually, in scaling invariance applications the scaling range is fixed and finite due to physical constraints of the imaging system.

Given an arbitrary vector $\bar{f}$ and a set of vectors, represented by B, a simple projection based algorithm for detecting the closest vector to $\bar{f}$, among the columns of B is presented below. The procedure assumes that $\bar{f}$ is close enough to a vector in B, so that projecting to a lower dimensionality does not compromise accuracy.

Projection Match Algorithm

STEP 1: Compute and store P=FB, where F is an arbitrary K×N matrix. (Done once at learn time)

STEP2: Compute $\bar{p}=F\bar{f}$

STEP3: Find the closest line-vector to $\bar{p}$, among the lines of P.

An optimal way of selecting the projection matrix, based on the shift invariant property of the UST, is presented below. The procedure is based on an optimal procedure for detecting delays in signals.

Choosing a Projection Matrix F

STEP 1: For the matrix B compute $X_B^{-1}$ unitary, according to Theorem 3.

STEP2: Select K/2 frequencies (K integer) of the UST of B according to the optimization below, where g(k) is the UST of $f_0$ at frequency k ($f_0$ is the first column of B).

$$\max_{k_1,\ldots,k_{K/2-1}} \min_r \sum_{i=0}^{K/2-1} |g(k_i)|^2 \left(1-\cos\frac{2\pi[k_i r]_N}{N}\right)$$

$$r, k_i \in \{1,\ldots,N/2-1\}$$

STEP3: Set the lines of F to be the real and imaginary parts of the selected k/2 lines of $X_B^{-1}$. The $k^{th}$ frequency corresponds to the $k^{th}$ line of $X_B^{-1}$.

A scaling invariant pattern matching algorithm, based on the Projection Match algorithm and in statistical sampling is presented below. The algorithm explores the finite range of the scaling factor to create an efficient image matching process.

Figure 11B:
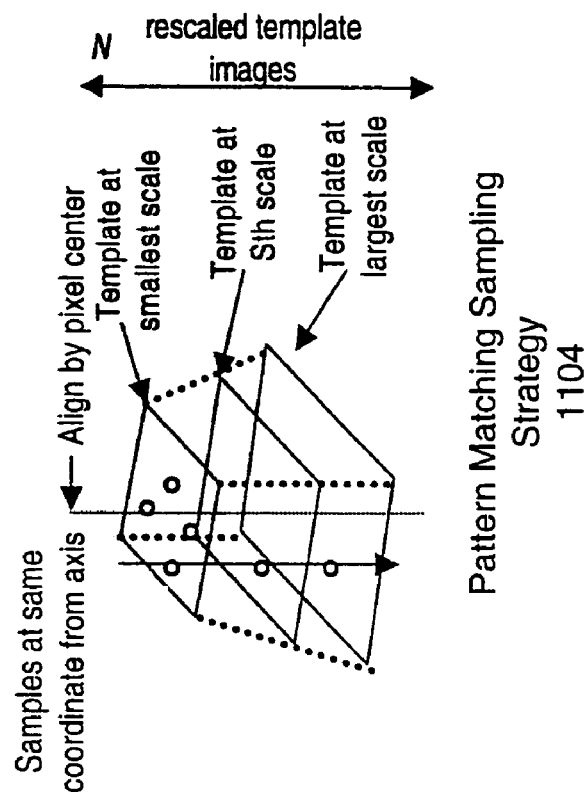
FIG. 11B illustrates a pattern matching sampling strategy, according to one embodiment.
Figure 11A:
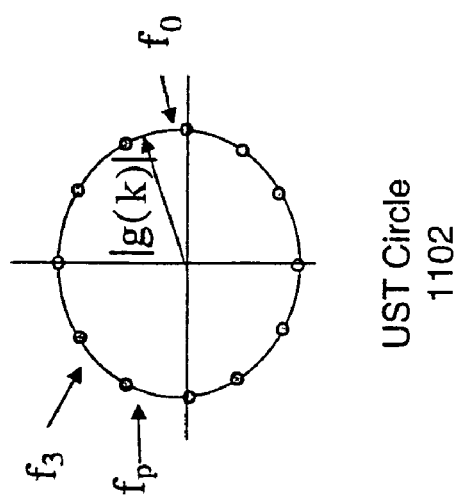
FIG. 11A illustrates a unified signal transform unit circle in the complex plane, according to one embodiment.

FIG. 11B presents the sampling process that generates the set $\{f_0,\ldots,f_{N-1}\}$. The template is rescaled (using bilinear interpolation) to N different discrete scaling factors, evenly distributed in the finite range. At each scaling factor, the same N distinct Halton points (in reference to the center of the image) are sampled. Note that the template image rescaled to the smallest scale determines the extent of the sampling area.

Pattern Matching Learning Phase

Inputs: template Image, scaling factor range $(s_0,s_1)$ and N (matching granularity).

Define $\Delta s=(s_1-s_0)/N$.

STEP1: Create 2D Holton set for rectangle of size $s_0 X$ by $s_0 Y$, where (X,Y) is the template size. Store the set of N reference coordinates $S=\{(x_0,y_0),\ldots,(x_{N-1},y_{N-1})\}$.

STEP2: For i=1 to N {

Rescale template image to scaling factor $s=s_0+i\Delta s$

Extract the pixel values of the N Holton samples (image center as reference)→results in $f_i$}

STEP3: Set each $f_i$ as a column of B and compute the projection matrix F as suggested in Table 1 (b). Randomized Correlator for lines of P can be determined in this step.

Figure 10:
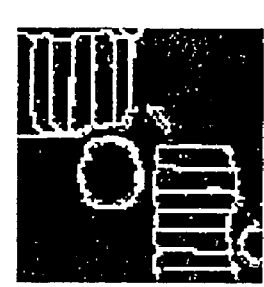
FIG. 10 illustrates shift invariant pattern matching for an industrial pattern matching application, according to one embodiment.
Figure 10:
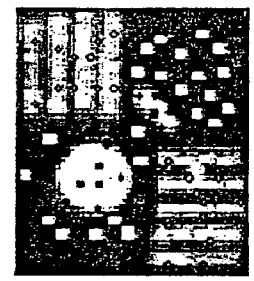
Figure 10:
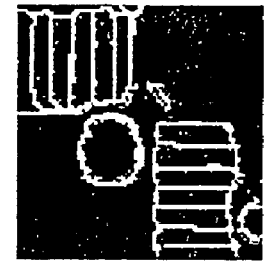

The matching phase comprises sliding the sampling structure defined by the statistical sampling over the test image (as in FIG. 10), and at each pixel location extracting the corresponding vector $\tilde{f}$. Then, finding the vector f closest to $\tilde{f}$ determines a match. A full normalized correlation between the chosen vector f and $\tilde{f}$ determines a score. The best match is the match with highest score among all pixel locations. This procedure is presented below.

Pattern Matching Runtime
Inputs: Test Image, learnt data.
For each pixel (i,j) do:
  STEP1: Shift the set of reference coordinates to the pixel (i,j). Extract the intensity (pixel) values to $\tilde{f}$.
  STEP2: Compute $\bar{p}=F\tilde{f}$
  STEP3: Find line vector in P closest to $\bar{p}$ (Randomized Correlator could be used)
  STEP4: Compute normalized correlation between $f_i$ (corresponding to the line vector in STEP3) and $\tilde{f}$, referred to as the score.
  STEP5: If (score>threshold) match is found, exit search.

Computational Complexity and Performance

The main advantage of the pattern matching algorithm presented above is its relatively low computational complexity compared to classical procedures. In order to compute the computational complexity, assume that the template is of size M×M, the test image is of size N×N and that K discrete scale steps are used. In all cases, complexity will be measured as number of required multiplications. Assume also that M<<N.

The classic correlation approach would be to compute the correlation of the test. image with the K rescaled template images. The classic statistical sampling approach would incorporate statistical sampling into the correlation computation. Finally, the algorithm proposed above incorporates UST projection and a randomized correlator to reduce computation even further. The number of multiplications for each method is presented below.

| Algorithm | Number of Multiplications |
|---|---|
| Classic Correlation | $KM^2N^2$ |
| Classic Statistical Sampling | $K^2N^2$ |
| Proposed Method | $((p + 1)K + O(p))N^2 \approx 2KN^2$ |

The scale invariant pattern matching algorithm has been implemented in the National Instruments LabVIEW development environment. Based on experiments, the suggested number of Halton samples required has been determined to be between 60-80 (N) and the number of projection vectors between 4 and 8 (K).

Thus, a new method for real-time scale invariant and/or rotation invariant pattern matching is presented based on the shift invariance property of a new transform which is computed for a given set of basis signals. One advantage of the proposed approach is that any affine transform may be included as part of the method.

Theorems
Theorem 1: The matrix $X_B^{-1}$ defines a shift invariant transformation for the set of vectors $f_i$.

Proof: From the definition of the matrix A, it is clear that $f_p=A^pf_0$. Using property P3 we can write $f_p=X_BV^pX_B^{-1}f_0$, resulting finally in $X_B^{-1}f_p=V^pX_B^{-1}f_0$, which is the matrix form of the shift invariance property of the DFT (note that for a DFT $f_p=f([n+p]_N)$).

Theorem 2: If the vectors $f_i$ are shifted versions of each other (i.e. $f_i=f([n+i]_N)$) then $X_B^{-1}$ is the Fourier matrix.

Proof: For the specified set of vectors, B'=I'B where I' is the column-wise shifted identity matrix (for example, for $$N=3,\ I' = \begin{bmatrix} 0 & 1 & 0 \\ 0 & 0 & 1 \\ 1 & 0 & 0 \end{bmatrix}).$$

It is clear then that A=I'. If we set $X_B^{-1}=W_N$, where $W_N$ is the DFT matrix, then $I'=W_N^{-1}VW_N$ which can be verified by direct computation.

Theorem 3: Given a regular matrix B the generalized transform can be computed as $X_B^{-1}=D^{-1}W_NB^{-1}$, where D is an arbitrary complex diagonal matrix. To define a unitary transform the diagonal elements of D should be set to $$d_k = \sqrt{\sum_{i=0}^{N-1} |B_i^{inv}(k)|^2},$$

where $B_i^{inv}(k)$ represents the Discrete Fourier Transform of the $i^{th}$ column of $B^{-1}$.

Proof: Using P1, B'=I'B, and $I'=W_N^{-1}VW_N$ (Theorem 2) one can equate $X_BVX_B^{-1}B=BW_N^{-1}VW_N$. This directly implies that $X_B^{-1}=D^{-1}W_NB^{-1}$, where D is an arbitrary diagonal matrix. Moreover, each column of $W_NB^{-1}$ is $B_i^{inv}(k)$ (for k=0, . . . , N−1).

The definition of an unitary transform requires that every line of $W_NB^{-1}$ have unit norm. It is clear then that $$d_k = \sqrt{\sum_{i=0}^{N-1} |B_i^{inv}(k)|^2}.$$

The proposed algorithm is almost K/2 times faster than the existing algorithms. Notice that the term O(p) corresponds to the complexity of computing the match in P using a randomized correlator. It is noted that for unbalanced sets of points this correlator has linear complexity.

As noted above, when a set of N signals exhibit certain characteristics, then the generalized basis functions may reduce to the Haar transform basis functions.

EXAMPLE

Assume we are given the following matrix $$B = \begin{pmatrix} b_{11} & b_{12} & b_{21} & b_{22} \\ b_{21} & b_{22} & b_{11} & b_{12} \\ b_{31} & b_{32} & b_{41} & b_{42} \\ b_{41} & b_{42} & b_{31} & b_{32} \end{pmatrix}$$

with ($\epsilon$ is very small)

$$b_{12} = \left(\frac{1+i}{2}\right)b_{31} + \left(\frac{1-i}{2}\right)b_{41}$$

$$b_{22} = \left(\frac{1-i}{2}\right)b_{31} + \left(\frac{1+i}{2}\right)b_{41}$$

$$b_{32} = \left(\frac{1+i}{2}\right)b_{11} + \left(\frac{1-i}{2}\right)b_{21}$$

$$b_{42} = \left(\frac{1-i}{2}\right)b_{11} + \left(\frac{1+i}{2}\right)b_{21}$$

$$b_{21} = b_{11} + \varepsilon$$

$$b_{41} = b_{31}$$

The two free parameters $b_{11}$ and $b_{31}$ are chosen in such a manner that B is regular. It can be shown that $$A = B'B^{-1} = 0.5 \begin{pmatrix} 0 & 0 & 1+i & 1-i \\ 0 & 0 & 1-i & 1+i \\ 1+i & 1-i & 0 & 0 \\ 1-i & 1+i & 0 & 0 \end{pmatrix}$$

which results in the Walsh-matrix $$X_B = 0.5 \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

EXAMPLE APPLICATIONS

As mentioned above, there are many real-world applications for methods of pattern or signal matching. The following examples of pattern matching applications are intended to be illustrative, and are not intended to limit the scope or domain of applicability of the present method.

As noted above, an exemplary application of pattern matching relates to matched filtering in telecommunications systems. Such filtering provides a way to discriminate a signal waveform from a noisy signal background.

In biometric applications of pattern matching, the input signal of interest may be a received biometric feature signal, such as fingerprint, voice pattern information, facial feature information, or any other biometric feature signal, which corresponds to one of a set of identified biometric candidate signals. A successful match between the received biometric feature signal and a candidate signal may be used to positively identify a user to determine whether to provide the user access to a secure system, such as a secure building, smart card, or restricted computer system, among others. Other uses for such biometric pattern matching may include forensic, anthropologic, and physiologic applications.

Many applications of pattern matching relate to 2-dimensional (2D) image matching. Such image matching is commonly used in machine vision systems for inspecting parts in automated manufacturing or assembly lines. Typically, a template image of a feature or component must be matched to a sub-region of one of a number of candidate images. For example, the presence and orientation of a computer chip may be determined for a circuit board on an assembly line, and if the computer chip is found to be missing or misaligned, the circuit board may be rejected. Another example of 2D pattern matching is related to visual identification of human faces, e.g., image matching may be used to identify a person by matching a received facial image to one of a set of candidate facial images, such as from an FBI image database. Yet another application of 2D image pattern matching is related to the interpretation of images for medical diagnostics, such as images produced by positron emission tomography, x-rays, nuclear magnetic resonance, or other medical imaging technologies.

Image matching applications are not limited to 2-dimensional images. For example, some medical scanning devices are able to produce 3-dimensional images of a patient's body parts, such as computer assimilated ultra-sound images. Such 3D images may be matched to known 3D candidate images for diagnostic purposes. In another medical application of pattern matching, a received signal or image of heart or brain function, such as an electrocardiogram (EKG) or electroencephalogram (EEG), may be matched with archetypal patterns characterizing specific conditions for diagnostic purposes.

Pattern matching also has myriad applications in the areas of finance, business, and the stock and bonds markets. For example, in a stock analysis application, the input signal of interest may be a stock price history, and the candidate signals may be a set of characteristic stock price waveforms indicating various archetypal performance scenarios.

As noted above, higher dimensional data sets may also be matched using the present method, allowing for sophisticated analyses and characterization of extremely complex phenomena.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for determining a best match of an input signal of interest from a set of candidate signals, the method comprising:

determining a signal transform from the set of candidate signals, wherein two or more of the candidate signals are uncorrelated, wherein the signal transform is operable to convert an arbitrary signal into a representation in terms of generalized basis functions, and wherein the basis functions represent an algebraic structure of the set of candidate signals;

applying the signal transform for at least one generalized frequency to each of the set of candidate signals to calculate a corresponding at least one generalized frequency component value for each of the set of candidate signals;

receiving the input signal of interest;

applying the signal transform for the at least one generalized frequency to the input signal of interest to calculate a corresponding at least one generalized frequency component value for the input signal of interest;

determining a best match between the at least one generalized frequency component value of the input signal of interest and the at least one generalized frequency component value of each of the set of candidate signals; and outputting information indicating a best match candidate signal from the set of candidate signals.

2. The method of claim 1, wherein said determining a best match between the at least one generalized frequency component value of the input signal of interest and the at least one generalized frequency component value of each of the set of candidate signals comprises:

subtracting each of the respective at least one generalized frequency component values of each candidate signal from the at least one generalized frequency component value of the input signal of interest; and determining a smallest difference between each of the respective at least one generalized frequency component values of each candidate signal and the at least one generalized frequency component value of the input signal of interest;

wherein a candidate signal corresponding to the smallest difference is the best match candidate signal.

3. The method of claim 1,
wherein the signal transform includes the set of basis functions which describe the algebraic structure of the set of candidate signals.

4. The method of claim 1,
wherein the signal transform is operable to convert each of the set of candidate signals to a generalized frequency domain.

5. The method of claim 1,
wherein the signal transform is operable to convert each of the set of candidate signals into a representation in terms of the generalized basis functions.

6. The method of claim 1,
wherein the signal transform is operable to decompose the input signal of interest into the generalized basis functions.

7. The method of claim 1,
wherein all of the candidate signals are uncorrelated with each other.

8. The method of claim 1,
wherein the input signal of interest and the candidate signals are one of 1-dimensional signals, 2-dimensional signals, or 3-dimensional signals.

9. The method of claim 1,
wherein the input signal of interest and the candidate signals are of a dimensionality greater than 3.

10. The method of claim 1,
wherein the input signal of interest and the candidate signals comprise one or more of image data, measurement data, acoustic data, seismic data, financial data, stock data, futures data, business data, scientific data, medical data, insurance data, musical data, biometric data, and telecommunications signals.

11. The method of claim 1,
wherein said determining a signal transform for the set of candidate signals comprises:

forming a matrix B from all of the values of the candidate signals, wherein each of the candidate signals comprises a corresponding column of the matrix B;

defining a matrix B', wherein the matrix B' comprises a column-wise cyclic shifted matrix B;

defining a matrix A, wherein the matrix A comprises a cyclic shift matrix operator, wherein multiplying matrix A times matrix B performs a column-wise cyclic shift on matrix B, thereby generating matrix B', wherein AB =B', wherein A=B'B$^{-1}$, wherein B$^{-1}$ comprises an inverse matrix of matrix B, and wherein A$^N$=an N×N identity matrix, I;

performing a Jordan decomposition on A=B'B$^{-1}$, thereby generating a relation A=X$_B$ΛX$_B^{-1}$, wherein X$_B$ comprises a matrix of normalized columnar eigenvectors of matrix B, wherein Λ comprises a diagonal matrix of eigenvalues of matrix B, and wherein X$_B^{-1}$ comprises an inverse matrix of matrix X$_B$; and calculating matrix X$_B^{-1}$, wherein the matrix X$_B^{-1}$ comprises the signal transform.

12. The method of claim 11,
wherein the set of candidate signals comprises a number of candidate signals, wherein each of the candidate signals comprises a number of values, and wherein the number of values is equal to the number of candidate signals.

13. The method of claim 12, wherein the matrix B is regular.

14. The method of claim 1, further comprising:
receiving an initial set of N candidate signals before said determining a signal transform from the set of candidate signals, wherein at least one of said initial set of candidate signals comprises a set of M values, wherein M is greater or less than N.

15. The method of claim 14, wherein M is less than N, the method further comprising:
providing additional N-M values for the at least one of said initial set of candidate signals, thereby generating said set of candidate signals, wherein each one of said set of candidate signals comprises N values.

16. The method of claim 15, wherein said providing additional N-M values comprises interpolating two or more of the M values to generate the additional N-M values.

17. The method of claim 15, wherein said providing additional N-M values comprises extrapolating two or more of the M values to generate the additional N-M values.

18. The method of claim 14, wherein M is less than N, the method further comprising:
fitting a curve to the M values for the at least one of said initial set of candidate signals;
sampling the curve to generate N values for the at least one of said initial set of candidate signals, thereby generating said set of candidate signals, wherein each one of said set of candidate signals comprises N values.

19. The method of claim 1, further comprising:
receiving an initial set of M candidate signals before said determining a signal transform from the set of candidate signals, wherein each of said initial set of candidate signals comprises a set of N values, and wherein M is less than N.

20. The method of claim 19, the method further comprising:
providing an additional N-M candidate signals to said initial set of candidate signals, thereby generating said set of candidate signals, wherein said set of candidate signals comprises N candidate signals, and wherein each one of said set of candidate signals comprises N values.

21. The method of claim 20, wherein said providing an additional N-M candidate signals to said initial set of candidate signals comprises providing N-M arbitrary candidate signals.

22. The method of claim 1, wherein said outputting information comprises displaying the information on a display screen.

23. The method of claim 1, wherein said outputting information comprises storing the best match candidate signal in a memory medium of a computer system.

24. The method of claim 1, further comprising:
processing the best match candidate signal to determine if the best match candidate is an acceptable match.

25. The method of claim 1, further comprising:
processing the best match candidate signal to determine characteristics of the received input signal of interest.

26. A computer readable memory medium comprising program instructions which are executable to determine a closest match between an input signal of interest and one of a set of candidate signals, wherein the program instructions are executable to perform:
determining a signal transform for the set of candidate signals, wherein two or more of the candidate signals are uncorrelated, wherein the signal transform is operable to convert an arbitrary signal into a representation in terms of generalized basis functions, and wherein the basis functions represent an algebraic structure of the set of candidate signals;
calculating one or more values of the signal transform applied to each of the set of candidate signals at at least one generalized frequency;
receiving the input signal of interest;
calculating one or more values of the signal transform applied to the input signal of interest at the at least one generalized frequency;
determining a best match between the one or more values of the transformation of the input signal of interest and the one or more values of the transformation for each of the set of candidate signals; and
outputting information indicating a closest match candidate signal of the set of candidate signals.

27. The memory medium of claim 26, wherein the signal transform includes the set of basis functions which describe the algebraic structure of the set of candidate signals.

28. The memory medium of claim 26, wherein the signal transform is operable to convert each of the set of candidate signals to a generalized frequency domain.

29. The memory medium of claim 26, wherein the signal transform is operable to convert each of the set of candidate signals into a representation in terms of the generalized basis functions.

30. The memory medium of claim 26, wherein the signal transform is operable to decompose the input signal into the generalized basis functions.

31. The memory medium of claim 26, wherein the representation of the input signal comprises a weighted sum of the generalized basis functions.

32. The memory medium of claim 26, wherein all of the candidate signals are uncorrelated with each other.

33. The memory medium of claim 26, wherein the input signal of interest and the candidate signals are one of 1-dimensional signals, 2-dimensional signals, or 3-dimensional signals.

34. The memory medium of claim 26, wherein the input signal of interest and the candidate signals are of a dimensionality greater than 3.

35. The memory medium of claim 26, wherein the input signal of interest and the candidate signals comprise one or more of image data, measurement data, acoustic data, seismic data, financial data, stock data, futures data, business data, scientific data, medical data, insurance data, musical data, biometric data, and telecommunications signals.

36. The memory medium of claim 26, wherein said outputting information comprises displaying the information on a display screen.

37. The memory medium of claim 26, wherein said outputting information comprises storing the best match candidate signal in a memory medium of a computer system.

38. A computer-implemented method for determining a best match of an input image of interest from a set of candidate images, the method comprising:
determining a signal transform from the set of candidate images, wherein two or more of the candidate images are uncorrelated, wherein the signal transform is operable to convert an arbitrary image into a representation in terms of generalized basis functions, and wherein the basis functions represent an algebraic structure of the set of candidate images;
applying the signal transform for at least one generalized frequency to each of the set of candidate images to calculate a corresponding at least one generalized frequency component value for each of the set of candidate images;
receiving the input image of interest;
applying the signal transform for the at least one generalized frequency to the input image of interest to calculate a corresponding at least one generalized frequency component value for the input image of interest;
determining a best match between the at least one component value of the input image of interest and the at least one component value of each of the set of candidate images; and
outputting information indicating a best match candidate image from the set of candidate images.

39. A computer-implemented method for determining a best match of an input data set of interest from a set of candidate data sets, the method comprising:
determining a signal transform from the set of candidate data sets, wherein two or more of the candidate data sets are uncorrelated, wherein the signal transform is operable to convert an arbitrary data set into a representation in terms of generalized basis functions, and wherein the basis functions represent an algebraic structure of the set of candidate data sets;
applying the signal transform for at least one generalized frequency to each of the set of candidate data sets to calculate a corresponding at least one generalized frequency component value for each of the set of candidate data sets;
receiving the input data set of interest;
applying the signal transform for the at least one generalized frequency to the input data set of interest to calculate a corresponding at least one generalized frequency component value for the input data set of interest;
determining a best match between the at least one component value of the input data set of interest and the at least one component value of each of the set of candidate data sets; and
outputting information indicating a best match candidate data set from the set of candidate data sets.

40. A computer-implemented method for determining a best match of an input biometric signal of interest from a set of candidate biometric signals, the method comprising:
determining a signal transform from the set of candidate biometric signals, wherein two or more of the candidate biometric signals are uncorrelated, wherein the signal transform is operable to convert an arbitrary biometric signal into a representation in terms of generalized basis functions, and wherein the basis functions represent an algebraic structure of the set of candidate biometric signals;

applying the signal transform for at least one generalized frequency to each of the set of candidate biometric signals to calculate a corresponding at least one generalized frequency component value for each of the set of candidate biometric signals;

receiving the input biometric signal of interest;

applying the signal transform for the at least one generalized frequency to the input biometric signal of interest to calculate a corresponding at least one generalized frequency component value for the input biometric signal of interest;

determining a best match between the at least one component value of the input biometric signal of interest and the at least one component value of each of the set of candidate biometric signals; and outputting information indicating a best match candidate biometric signal from the set of candidate biometric signals.

41. A computer-implemented method for determining a best match of an input stock history waveform of interest from a set of candidate stock behavior waveforms, the method comprising:

determining a signal transform from the set of candidate stock behavior waveforms, wherein two or more of the candidate stock behavior waveforms are uncorrelated, wherein the signal transform is operable to convert an arbitrary stock behavior waveform into a representation in terms of generalized basis functions, and wherein the basis functions represent an algebraic structure of the set of candidate stock behavior waveforms;

applying the signal transform for at least one generalized frequency to each of the set of candidate stock behavior waveforms to calculate a corresponding at least one generalized frequency component value for each of the set of candidate stock behavior waveforms;

receiving the input stock history waveform of interest;

applying the signal transform for the at least one generalized frequency to the input stock history waveform of interest to calculate a corresponding at least one generalized frequency component value for the input stock history waveform of interest;

determining a best match between the at least one component value of the input stock history waveform of interest and the at least one component value of each of the set of candidate stock behavior waveforms; and outputting information indicating a best match candidate stock history waveform from the set of candidate stock behavior waveforms.

42. A computer-implemented method for determining a best match of an input telecommunications signal of interest from a set of candidate telecommunications signals, the method comprising:

determining a signal transform from the set of candidate telecommunications signals, wherein two or more of the candidate telecommunications signals are uncorrelated, wherein the signal transform is operable to convert an arbitrary telecommunications signal into a representation in terms of generalized basis functions, and wherein the basis functions represent an algebraic structure of the set of candidate telecommunications signals;

applying the signal transform for at least one generalized frequency to each of the set of candidate telecommunications signals to calculate a corresponding at least one generalized frequency component value for each of the set of candidate telecommunications signals;

receiving the input telecommunications signal of interest;

applying the signal transform for the at least one generalized frequency to the input telecommunications signal of interest to calculate a corresponding at least one generalized frequency component value for the input telecommunications signal of interest;

determining a best match between the at least one component value of the input telecommunications signal of interest and the at least one component value of each of the set of candidate telecommunications signals; and outputting information indicating a best match candidate telecommunications signal from the set of candidate telecommunications signals.

43. A computer-implemented method for determining a best match of an input medical image of interest from a set of candidate medical images, the method comprising:

determining a signal transform from the set of candidate medical images, wherein two or more of the candidate medical images are uncorrelated, wherein the signal transform is operable to convert an arbitrary medical image into a representation in terms of generalized basis functions, and wherein the basis functions represent an algebraic structure of the set of candidate medical images;

applying the signal transform for at least one generalized frequency to each of the set of candidate medical images to calculate a corresponding at least one generalized frequency component value for each of the set of candidate medical images;

receiving the input medical image of interest;

applying the signal transform for the at least one generalized frequency to the input medical image of interest to calculate a corresponding at least one generalized frequency component value for the input medical image of interest;

determining a best match between the at least one component value of the input medical image of interest and the at least one component value of each of the set of candidate medical images; and outputting information indicating a best match candidate medical image from the set of candidate medical images.

44. A computer-implemented method for determining a best match of an input signal of interest from a set of candidate signals, the method comprising:

receiving the input signal of interest;

applying a signal transform for at least one generalized frequency to the input signal of interest to calculate a corresponding at least one generalized frequency component value for the input signal of interest, wherein the signal transform is determined from the set of candidate signals, wherein two or more of the candidate signals are uncorrelated, wherein the signal transform is operable to convert an arbitrary signal into a representation in terms of generalized basis functions, and wherein the basis functions represent an algebraic structure of the set of candidate signals;

determining a best match between the at least one generalized frequency component value of the input signal of interest and at least one generalized frequency component value of each of the set of candidate signals; and outputting information indicating a best match candidate signal from the set of candidate signals.

* * * * *